United States Patent
De Zwart et al.

(10) Patent No.: US 8,780,188 B2
(45) Date of Patent: Jul. 15, 2014

(54) AUTOSTEREOSCOPIC DISPLAY DEVICE

(75) Inventors: Siebe Tjerk De Zwart, Eindhoven (NL); Oscar Hendrikus Willemsen, Eindhoven (NL); Martin Gerard Hendrik Hiddink, S-Hertogenbosch (NL); Robert-Paul Mario Berretty, Eindhoven (NL); Marcellinus Petrus Carolus Michael Krijn, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 572 days.

(21) Appl. No.: 12/997,885

(22) PCT Filed: Jun. 26, 2009

(86) PCT No.: PCT/IB2009/052765
§ 371 (c)(1),
(2), (4) Date: Dec. 14, 2010

(87) PCT Pub. No.: WO2009/156968
PCT Pub. Date: Dec. 30, 2009

(65) Prior Publication Data
US 2011/0164036 A1 Jul. 7, 2011

(51) Int. Cl.
*H04N 13/04* (2006.01)
(52) U.S. Cl.
USPC .......................................................... 348/59
(58) Field of Classification Search
USPC .......................................................... 348/59
See application file for complete search history.

(56) References Cited

U.S. PATENT DOCUMENTS

| | | | | |
|---|---|---|---|---|
| 4,429,946 A * | 2/1984 | Haines | ............................ | 359/22 |
| 4,474,459 A * | 10/1984 | Tokumaru | ....................... | 355/46 |
| 5,365,354 A * | 11/1994 | Jannson et al. | ................. | 359/15 |
| 5,392,140 A * | 2/1995 | Ezra et al. | ........................ | 349/15 |
| 5,537,171 A * | 7/1996 | Ogino et al. | ................... | 353/122 |
| 5,905,593 A * | 5/1999 | Lo et al. | ........................ | 359/463 |
| 6,064,424 A * | 5/2000 | van Berkel et al. | ............. | 348/51 |
| 6,239,907 B1* | 5/2001 | Allen et al. | .................... | 359/443 |
| 6,469,830 B1* | 10/2002 | Dubin et al. | ................... | 359/449 |
| 6,829,086 B1* | 12/2004 | Gibilini | ......................... | 359/453 |
| 6,832,037 B2* | 12/2004 | Aylward et al. | ................ | 385/145 |
| 6,859,240 B1* | 2/2005 | Brown et al. | .................... | 349/15 |
| 7,091,652 B2* | 8/2006 | Morley et al. | .................. | 313/110 |
| 2002/0021492 A1* | 2/2002 | Morishima et al. | ........... | 359/463 |
| 2004/0066510 A1* | 4/2004 | Hoff et al. | ...................... | 356/317 |
| 2004/0109115 A1* | 6/2004 | Tsai et al. | ...................... | 349/117 |

(Continued)

FOREIGN PATENT DOCUMENTS

DE 102005010974 A1 9/2006
GB 2309609 A 7/1997

(Continued)

*Primary Examiner* — Sath V Perungavoor
*Assistant Examiner* — Peter D Le

(57) ABSTRACT

An autostereoscopic display device comprising a view forming module in registration with an image forming means. The image forming means has an orthogonal array of display pixels spatially defined by an opaque matrix. The view forming module provides at least two optical functions, namely a view forming function and a brightness non-uniformity reducing function. The view forming function modifies the direction of outputs of the display pixels such that the outputs of groups of the display pixels are projected in respective different directions as a plurality of views. The brightness non-uniformity reducing function spreads the outputs of the display pixels.

16 Claims, 20 Drawing Sheets

(56) References Cited

U.S. PATENT DOCUMENTS

| | | | |
|---|---|---|---|
| 2004/0240777 A1* | 12/2004 | Woodgate et al. | 385/16 |
| 2005/0111100 A1* | 5/2005 | Mather et al. | 359/464 |
| 2005/0134762 A1* | 6/2005 | Sung et al. | 349/96 |
| 2005/0259323 A1* | 11/2005 | Fukushima et al. | 359/462 |
| 2005/0270654 A1* | 12/2005 | Goto et al. | 359/626 |
| 2006/0022059 A1* | 2/2006 | Juds | 235/494 |
| 2006/0056791 A1* | 3/2006 | Tzschoppe | 385/146 |
| 2006/0139759 A1* | 6/2006 | Hashimoto et al. | 359/619 |
| 2006/0170869 A1* | 8/2006 | Shestak et al. | 352/57 |
| 2006/0203336 A1* | 9/2006 | Van Berkel et al. | 359/462 |
| 2006/0262376 A1* | 11/2006 | Mather et al. | 359/248 |
| 2007/0183033 A1 | 8/2007 | Schwerdtner | |
| 2007/0188517 A1* | 8/2007 | Takaki | 345/613 |
| 2007/0200792 A1* | 8/2007 | Kim et al. | 345/7 |
| 2009/0128914 A1* | 5/2009 | Lee et al. | 359/599 |
| 2009/0153959 A1* | 6/2009 | Tao et al. | 359/463 |
| 2009/0322862 A1* | 12/2009 | Marie Vissenberg et al. | 348/59 |
| 2010/0295762 A1* | 11/2010 | Yeom et al. | 345/87 |
| 2011/0122599 A1* | 5/2011 | Lin et al. | 362/97.1 |

FOREIGN PATENT DOCUMENTS

| | | |
|---|---|---|
| GB | 2196166 A | 4/1998 |
| JP | 03194588 A | 8/1991 |
| WO | 02059657 A1 | 8/2002 |
| WO | 2005055617 A1 | 6/2005 |
| WO | 2006005278 A1 | 1/2006 |
| WO | 2006021242 A1 | 3/2006 |
| WO | 2007031931 A2 | 3/2007 |

\* cited by examiner

AUTOSTEREOSCOPIC DISPLAY DEVICE

FIELD OF THE INVENTION

This invention relates to an autostereoscopic display device comprising an image forming means, such as a display panel having an array of display pixels, and a view forming means. The view forming means is, or is configurable to function as, an array of view forming elements arranged over the image forming means through which the display pixels are viewed. The invention also relates to an autostereoscopic imaging method.

BACKGROUND OF THE INVENTION

A known autostereoscopic display device is described in GB 2196166 A. This known device comprises a two dimensional emissive liquid crystal display panel having a row and column array of display pixels acting as an image forming means to produce a display. An array of elongate lenticular lenses extending parallel to one another overlies the display pixel array and acts as a view forming means. Outputs from the display pixels are projected through these lenticular lenses, which lenses function to modify the directions of the outputs.

The lenticular lenses are provided as a sheet of elements, each of which comprises an elongate semi-cylindrical lens element. The lenticular lenses extend in the column direction of the display panel, with each lenticular lens overlying a respective group of two or more adjacent columns of display pixels. A focal point of each lens coincides with a plane defined by the array of display pixels.

In an arrangement in which, for example, each lenticular lens is associated with two columns of display pixels, the display pixels in each column provide a vertical slice of a respective two dimensional sub-image. The lenticular sheet projects these two slices and corresponding slices from the display pixel columns associated with the other lenticular lenses, to the left and right eyes of a user positioned in front of the sheet, so that the user observes a single stereoscopic image.

In other arrangements, each lenticular lens is associated with a group of three or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are observed creating, for example, a look-around impression.

The above described autostereoscopic display device produces a display having good levels of brightness. However, a problem associated with the device is that the views projected by the lenticular sheet are separated by dark zones caused by "imaging" of the non-emitting black matrix which typically defines the display pixel array. These dark zones are readily observed by a user as brightness non-uniformities in the form of dark vertical bands spaced across the display. The bands move across the display as the user moves from left to right and the pitch of the bands changes as the user moves towards or away from the display.

A number of approaches have been proposed for reducing the amplitude of the non-uniformities. For example, the amplitude of the non-uniformities can be reduced by the well known technique of slanting the lenticular lenses at an acute angle relative to the column direction of the display pixel array. However, it remains difficult to reduce the intensity modulation depth introduced by imaging the black matrix to below 1%, at which level the non-uniformities remain perceivable and distracting for a user.

SUMMARY OF THE INVENTION

It has also been found that the intensity modulation depth introduced by imaging the black matrix in the above described devices varies as a function of the focusing power of the lenticular lenses. In general, defocusing the lenses in a device by increasing their focal length causes a reduction in the intensity modulation depth introduced by imaging the black matrix. However, defocusing the lenses also gives rise to some cross-talk between the views projected by the lenticular lenses, which may be detrimental to the three dimensional effect perceived by the user.

According to a first aspect of the present invention, there is provided a view forming module for arrangement in registration with an image forming means of an autostereoscopic display device, the image forming means having an orthogonal array of display pixels spatially defined by an opaque matrix, the view forming module providing at least two optical functions, a view forming function and a brightness non-uniformity reducing function, wherein the view forming function modifies the direction of outputs of the display pixels such that the outputs of groups of the display pixels are projected in respective different directions as a plurality of views, the view forming function being provided by an array of parallel view forming elements arranged across the view forming module and having a first pitch, and wherein the brightness non-uniformity reducing function spreads the outputs of the display pixels such that brightness non-uniformities caused by imaging of the opaque matrix are reduced, the brightness non-uniformity reducing function defining a second pitch across the view forming module less than the first pitch, and the brightness non-uniformity reducing function further defining an effective spreading angle in a plane perpendicular to axes of the view forming elements substantially equal to or less than the angle between adjacent views projected by the view forming function.

The expression "effective spreading angle" refers to the angle by which the outputs of the display pixels are spread (i.e. diverged) as measured once the outputs have been emitted by the view forming module (i.e. in air). The actual spreading angle defined by the brightness non-uniformity reducing function will depend on the refractive index of the material in which the function is provided. The actual spreading angle will also depend on whether the brightness non-uniformity reducing function is provided before or after the view forming function. For example, the actual spreading angle is larger than the effective spreading angle if the brightness non-uniformity reducing function is provided before the view forming function. The actual spreading angle is equal to the effective spreading angle if the brightness non-uniformity reducing function is provided after the view forming function or if the functions are provided at the same optical interface.

By the expression that the effective spreading angle is "substantially equal to or less than" the angle between adjacent views, it may in particular be required that the spreading angle is no greater than 1.5 times, preferably 1.3 times, and most preferably 1.1 times, the angle between adjacent views projected by the view forming function.

It has been found that the brightness non-uniformities caused by imaging of the opaque matrix in an autostereoscopic display device can be reduced by spreading (i.e. diverging) the outputs of the display pixels, to thereby "close"

the dark bands between adjacent views. Moreover, it has been found that this spreading technique is more effective at reducing the non-uniformities when the means by which the spreading function is provided has a pitch which is less than the pitch of the view forming elements.

The invention is particularly suited to view forming modules in which the view forming elements are lenticular lenses. Over a range of viewing angles, the focal points of lenticular lenses have been found in practice to define a curved surface. In known autostereoscopic display devices in which the lenticular lenses are simply defocused to reduce brightness non-uniformities, focal points for normal (perpendicular) light are generally positioned behind a plane defined by the display pixels, but focal points for non-normal light (corresponding to larger viewing angles) will coincide with this plane. As a consequence, the brightness non-uniformities are effectively suppressed at and around the normal viewing angle, but not at the larger viewing angles.

By spreading (i.e. diverging) the outputs of display pixels with a pitch which is less than the pitch of the lenticular lenses, as opposed for example to merely defocusing the lenticular lenses (whereby a pitch of the spreading function is equal to the pitch of the lenticular lenses), the brightness non-uniformity reducing function is effectively decoupled from the view forming function, and the brightness non-uniformities may therefore be suppressed across a wide range of viewing angles. Although some viewing angle dependent effects may remain, these are significantly reduced.

Furthermore, such an arrangement may be more robust with regard to dimensional tolerances of the optical components, since small errors in the effective spreading angle of the brightness non-uniformities reducing function do not significantly affect the autostereoscopic performance of the display device, which performance is dependent on the view forming function.

In embodiments in which the array of view forming elements is a first array of lenticular lenses, the lenses may be arranged for slanting with respect to the column direction of the display pixels, to thereby further reduce brightness non-uniformities.

The invention also provides an autostereoscopic display device comprising an image forming means having an orthogonal array of display pixels for producing a display, the display pixels being spatially defined by an opaque matrix, and further comprising the view forming module described above arranged in registration with the image forming means. The view forming module is preferably arranged parallel to the image forming means.

The image forming means may be a liquid crystal display panel comprising a backlight for producing an emissive display. Other types of emissive display panel may alternatively be used.

The effective spreading angle of the brightness non-uniformity reducing function in the plane perpendicular to the axes of the view forming elements may be substantially equal to the angle between adjacent views projected by the view forming function. By the expression that the effective spreading angle is "substantially equal to" the angle between adjacent views, it may in particular be required that the effective spreading angle is in the range 0.5 to 1.5 times, preferably 0.7 to 1.3 times, and most preferably 0.9 to 1.1 times, the angle between adjacent views projected by the view forming function. In this way, cross-talk between the views projected by the view forming function may be reduced to acceptable levels, which cross-talk may be detrimental to the three dimensional effect perceived by the user.

In embodiments, the curved focal surfaces defined by the first array of lenticular lenses providing the view forming function may each cross the plane defined by the array of display pixels at positions corresponding to a focal point for non-normal light. In this way, the inevitable variation in focus caused by the curved focal surfaces, and the resulting cross-talk, may be spread across a wide range of viewing angles. In other embodiments, the curved focal surfaces may each cross the plane defined by the array of display pixels at positions corresponding to a focal point for normal light. In this way, cross-talk at and around the normal viewing angle may be minimized, at the expense of greater cross-talk at larger viewing angles.

In a first group of embodiments, the brightness non-uniformity reducing function may be provided by a second array of parallel lenses, such as micro-lenticular lenses, arranged across the view forming module and having the second pitch.

The lenses of the second array may have a second pitch of no more than a half, and preferably no more than a third, of the first pitch of the lenses of the first array. In general, lenses having a smaller pitch are easier to manufacture, but lenses having a larger pitch provide improved functional performance.

The second array of lenses may be provided at an optical interface different to the optical interface of the first array, for example in different substrate surfaces.

Alternatively, the first and second arrays of lenses providing both the view forming and the brightness non-uniformity reducing function are integrated into the same optical interface, such that the view forming and brightness non-uniformity reducing functions are provided by refraction at the same optical interface.

In this case, the optical interface corresponding to each lens of the first array may comprise a plurality of flat faces defining a polygonal lens surface, the flat faces each corresponding to a lens of the second array. The number of flat faces may be equal to a number of views provided by the autostereoscopic display device. The number of flat surfaces, $N_{micro\text{-}lens}$, may be chosen somewhat less than $N_{views}$. Without wishing to be bound by theory, the number of flat surfaces giving minimum brightness non-uniformities may be given by:

$$N_{views} \cdot \frac{1}{1 + \left|\frac{R_L \cdot N_{views}^2}{\Delta n \cdot p_L^2}\lambda\right|}$$

with $\Delta n$ the difference of the refractive indices of the materials on either side of the lens surface, $p_L$ the pitch of the polygonal lenses, $R_L$ the radius of curvature of the firs lens array t and $\lambda$ the wavelength of the light used.

In practical situations a whole range of wavelengths is emitted by the display, but a good average value for $\lambda$ is 550 nm. For practical designs, the outcome of the equation, $N_{micro\text{-}lens}$, can be rounded to either of the integers nearest to the outcome of the above equation; (one higher than the outcome and the other lower than the outcome. Preferably the outcome is rounded to the nearest integer. This has advantage that diffractive effects that may possibly disturb the function of the arrangement and the display are accounted for.

In embodiments the radius of curvature of the lenses of the second micro lens array are such that when the second lens array is integrated by superposition with the first array, the optical interface corresponding to each lens of the first array may comprise a plurality of faces that is flat and/or non-flat and/or has equal or unequal pitch or width.

In embodiments one or more optical axes of the parallel lenses of the microlens array are slanted with respect to one or more optical axis of the lenses of the first lens array. The facets may thus be slanted with respect to the optical axis of the lenticular lenses.

In an embodiment the lenticular array and the microlens array may have semi-cylindrical lenses with an optical axis in the long direction.

In an embodiment there may be multiple microlens arrays having lenses with different pitch. Alternatively there may be only one second lens array that is an integration of multiple microlens arrays.

In a second group of embodiments, the brightness non-uniformity reducing function may be provided by a light diffuser. Light diffusers can generally be considered to have a zero pitch.

The light diffuser may be a surface light diffuser configured to provide diffusion by refraction at its surface or interface, or may alternatively be a scattering light diffuser configured to provide diffusion by the scattering of light. Suitable surface diffusers include holographic diffusers, micro-diffusers and engineered diffusers, the design and manufacture of which will be known to those skilled in the art.

The light diffuser may be arranged to spread the outputs of the display pixels substantially only in the plane perpendicular to the axes of the view forming elements. In this way, unnecessary blurring in the direction parallel to the axes of the view forming elements may be avoided.

Alternatively, the light diffuser may be arranged to spread the outputs of the display pixels with different spreading angles in first and second perpendicular planes. The light diffuser may then be rotated with respect to the array of view forming elements, such that the first and second perpendicular planes defines acute angles with the axes of the view forming elements. In this way, the amount of spreading in the plane perpendicular to the axes of the view forming elements may be tuned.

According to a second aspect of the invention, there is provided an autostereoscopic imaging method comprising:

forming an image using an orthogonal array of display pixels, the display pixels being spatially defined by an opaque matrix; and forming the image into a plurality of views projected in respective different directions using an array of parallel view forming elements arranged across the array of display pixels, the view forming elements modifying the direction of outputs from the display pixels, the view forming elements having a first pitch, wherein the outputs of the display pixels are additionally spread such that brightness non-uniformities caused by imaging of the opaque matrix are reduced, the spreading function defining a second pitch less than the first pitch, and the spreading function further defining an effective spreading angle in a plane perpendicular to axes of the view forming elements substantially equal to or less than the angle between adjacent views projected by the view forming function.

The effective spreading angle of the brightness non-uniformity reducing function in the plane perpendicular to the axes of the view forming elements may be substantially equal to the angle between adjacent views projected by the view forming function.

The array of parallel view forming elements may be a first array of parallel lenticular lenses.

The brightness non-uniformity reducing function may be provided by a second array of lenses, such as lenticular microlenses, and the first and second arrays may be integrated into the same optical interface or may be provided in respective different optical interfaces.

Alternatively, the brightness non-uniformity reducing function may be provided by a light diffuser. Light diffusers can generally be considered to have a zero pitch.

The light diffuser may be arranged to spread the outputs of the display pixels substantially only in the plane perpendicular to the axes of the view forming elements. In this way, unnecessary blurring in the direction parallel to the axes of the view forming elements may be avoided.

Alternatively, the light diffuser may be arranged to spread the outputs of the display pixels with different spreading angles in first and second perpendicular planes. In this way, the amount of spreading in the plane perpendicular to the axes of the view forming elements may be tuned.

BRIEF DESCRIPTION OF THE DRAWINGS

Embodiments of the invention will now be described, purely by way of example, with reference to the accompanying drawings, in which:

FIG. 15A represents two separate micro-lens arrays, FIG. 15B represents the same two micro-lens arrays as in FIG. 15A, but integrated into one micro-lens arrays and FIG. 15C represents a lenticular with the micro-lensarrays of either FIG. 15A or FIG. 15B integrated into the lenticular lens.

DETAILED DESCRIPTION OF THE EMBODIMENTS

The invention provides a multi-view autostereoscopic display device of the type that has an image forming means and a view forming module. The device may also have a driving means arranged to drive the image forming means with video data for the plurality of views.

The image forming means has an array of display pixels for producing a display, with the display pixels being spatially defined by an opaque matrix.

The view forming module is arranged in registration with the image forming means and provides at least two optical functions, namely a view forming function and a brightness non-uniformity reducing function.

The view forming function modifies the direction of outputs of the display pixels such that the outputs of groups of the display pixels are projected in respective different directions as a plurality of views. The view forming function is provided by an array of parallel view forming elements arranged across the view forming module and having a first pitch.

The brightness non-uniformity reducing function spreads the outputs of the display pixels such that brightness non-uniformities caused by imaging of the opaque matrix are reduced. The brightness non-uniformity reducing function defines a second pitch across the view forming module less than the first pitch, and further defines an effective spreading angle in a plane perpendicular to axes of the view forming elements substantially equal to or less than the angle between adjacent views projected by the view forming function.

Figure 1:
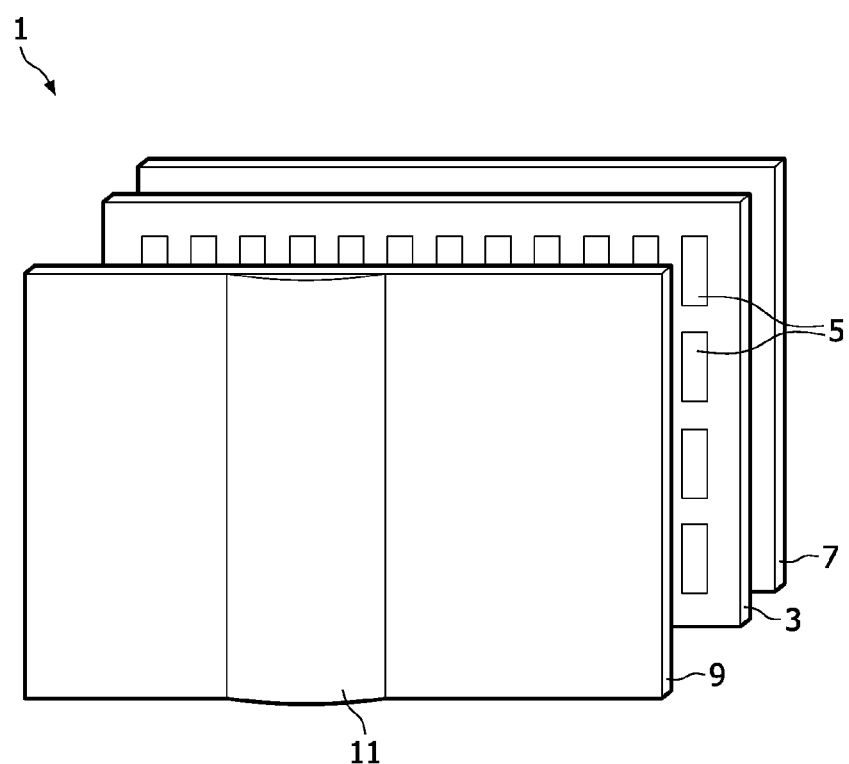
FIG. 1 is a schematic perspective view of an autostereoscopic display device.

FIG. 1 is a schematic perspective view of a known multi-view autostereoscopic display device 1. The known device 1 comprises a liquid crystal display panel 3 of the active matrix type that acts as an image forming means to produce the display.

The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes and a black matrix arrangement provided on the front of the panel 3. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular lenses 11 extending parallel to one another in the column direction of the display panel 3, of which only one is shown with exaggerated dimensions for the sake of clarity. The lenticular lenses 11 have focal points which approximately coincide with a plane of the display panel 3 and act as view forming elements to perform a view forming function.

The lenticular lenses 11 are in the form of convex cylindrical elements, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular lens 11 overlies a small group of display pixels 5 in each row. The lenticular lens 11 projects each display pixel 5 of a group in a different direction, so as to form the several different views. As the user's head moves from left to right, his/her eyes will receive different ones of the several views, in turn.

Figure 2:
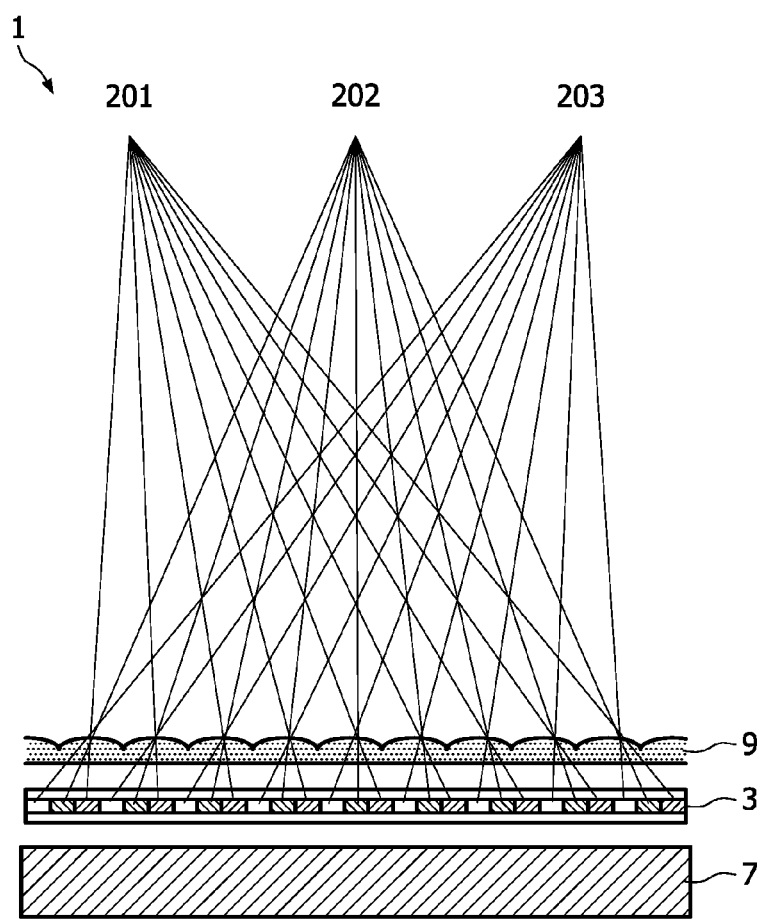
FIG. 2 is a schematic cross sectional view of the display device shown in FIG. 1 for explaining its mode of operation.

FIG. 2 shows the principle of operation of a lenticular type imaging arrangement as described above and shows the light source 7, display panel 3 and the lenticular sheet 9. The arrangement provides three views 201, 202 and 203 each projected in different directions. Each pixel of the display panel 3 is driven with information for one specific view.

The above described autostereoscopic display device produces a display having good levels of brightness. However, a problem associated with the device is that the views projected by the lenticular sheet 9 are separated by dark zones caused by imaging of the non-emitting black matrix which defines the display pixel array. These dark zones are readily observed by a user as brightness non-uniformities in the form of dark vertical bands spaced across the display. The bands move across the display as the user moves from left to right and the pitch of the bands changes as the user moves towards or away from the display. The bands are particularly problematic in devices having a high proportion of their display area as black matrix, such as high resolution displays designed for mobile applications.

Figure 3A:
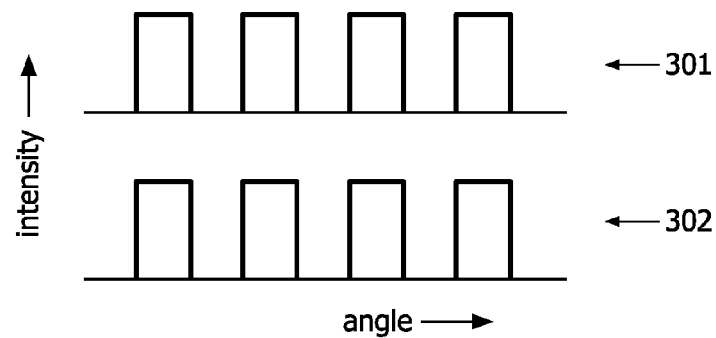
FIGS. 3A, 3B and 3C are diagrams for explaining techniques for reducing brightness non-uniformities in the output of the display device shown in FIG. 1.

The brightness non-uniformities caused by imaging of the black matrix are illustrated in FIG. 3A, which shows generalized plots of brightness intensity against viewing angle for the display device shown in FIGS. 1 and 2. The upper plot shows the contributions of the individual views 301, which contributions each have constant brightness intensity, interposed between the dark bands caused by imaging of the black matrix, which bands each have zero brightness intensity. The transition between views and dark bands is a step transition. The lower plot 302 shows the cumulative effect of the contributions of the individual views, that is to say the brightness levels observed by the user moving across the front of the display. It can be seen from the lower plot that there is a significant modulation of the brightness intensity.

Figure 3B:
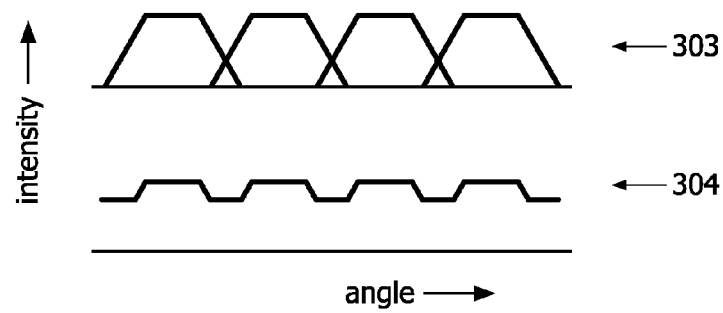

A number of approaches have been proposed for reducing the amplitude of the non-uniformities. For example, the amplitude of the non-uniformities can be reduced by the well known technique of slanting the lenticular lenses 11 at an acute angle relative to the column direction of the display pixel array. The resulting brightness non-uniformities are illustrated in FIG. 3B. In this Figure, the upper plot 303 again shows the contributions of the individual views interposed between the dark bands caused by imaging of the black matrix. It can be seen that the transition between views and dark bands is gradual, with the brightness intensity changing at a constant rate. The lower plot 304 shows the cumulative effect of the contributions of the individual views, and it can be seen that the intensity modulation depth introduced by imaging the black matrix is significantly reduced. However, it remains difficult to reduce this intensity modulation depth to below 1%, at which level the non-uniformities remain perceivable and distracting for a user.

Figure 3C:
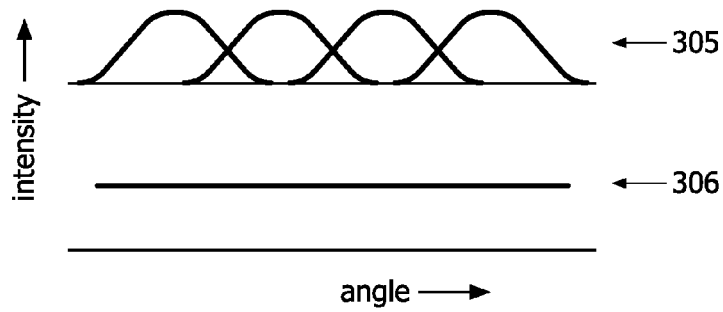

Although the technique of slanting the lenticular lenses 11 may serve to reduce the perceived brightness non-uniformities caused by imaging of the black matrix, further significant reductions may advantageously be achieved by defocusing the lenticular lenses 11. According to this technique, the focal lengths of the lenticular lenses 11 are extended so that their focal points lie behind the plane of the display panel 3. The resulting brightness non-uniformities are illustrated in FIG. 3C. In the upper plot 305, it can be seen that the transition between views and dark bands is gradual, with intensity changing at a varying rate. The lower plot 306 shows the cumulative effect of the contributions of the individual views, and it can be seen that the intensity modulation depth introduced by imaging the black matrix is almost completely eliminated.

The further reduction in the brightness non-uniformities obtained by defocusing the lenticular lenses 11 comes at the expense of introducing some cross-talk between the views, which is detrimental to the perceived three dimensional performance of the device. This cross-talk generally increases as the lenticular lenses 11 are defocused.

Figure 4A:
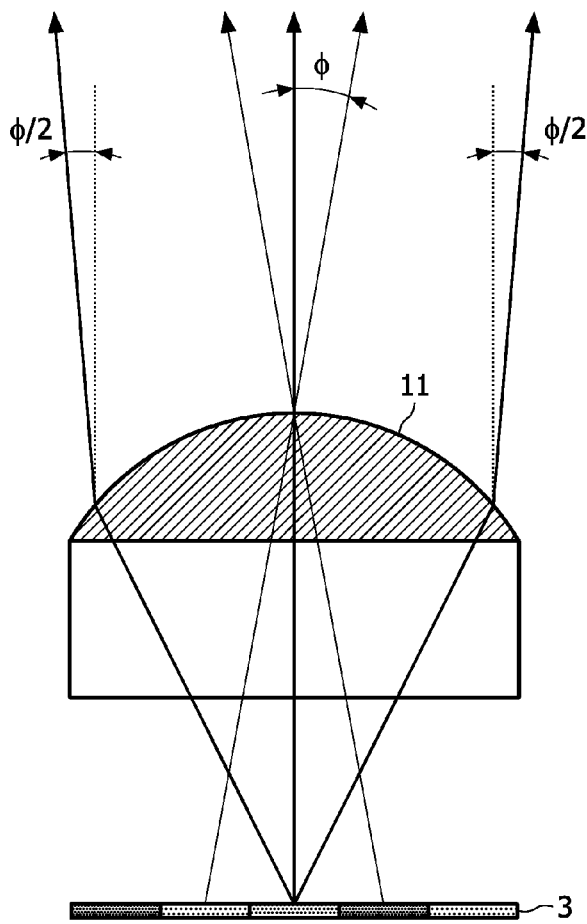
FIGS. 4A and 4B are further diagrams for explaining how brightness non-uniformities in the output of the display device shown in FIG. 1 may be reduced.
Figure 4B:
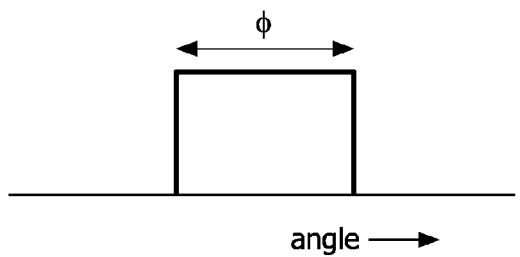

FIG. 4A shows an autostereoscopic display device of the type described above, in which the lenticular lenses 11 have been slanted and defocused to minimize the perceived brightness non-uniformities caused by imaging of the black matrix. For ideal lenticular lenses 11, the brightness non-uniformities can be minimized by extending the focal length of the lenticular lenses so as to provide a folding of the (far field) angular distribution with a block function, which function has a width equal to a multiple of the angle between adjacent views projected by the lenses. In order to maintain cross-talk at acceptably low levels, a block function having a width equal to the angle φ between adjacent views projected by the lenses, as shown in FIG. 4B, is selected.

As can be seen in FIG. 4A, the defocusing of the lenticular lenses 11 serves to spread, or expand, the outputs of the display pixels 5 corresponding to each view, to thereby even out the brightness non-uniformities caused by imaging of the black matrix.

It has been found that, in practice, the arrangement described with reference to FIGS. 4A and 4B above is only effective at reducing brightness non-uniformities for viewing angles at and around the normal (perpendicular) viewing angle. At larger viewing angles, the brightness non-uniformities tend to increase again to levels at which they are distracting for a user. The cause of this viewing angle-dependent effect will now be described with reference to FIGS. 5A to 5D.

Figure 5A:
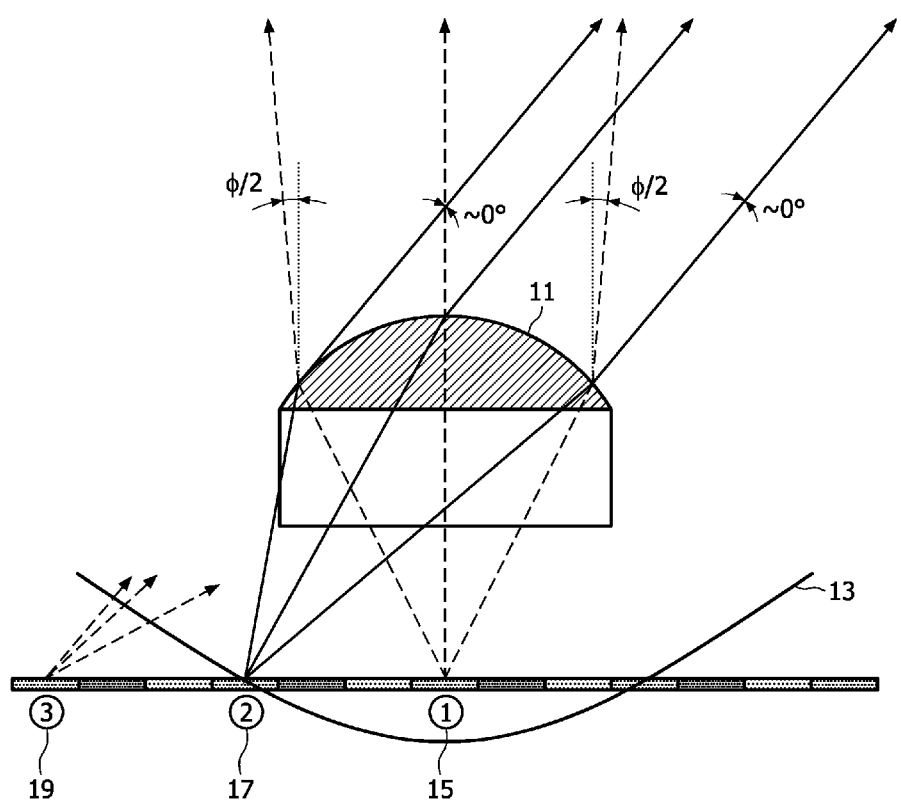
FIG. 5A is a schematic cross sectional view showing, for a range of viewing angles, the focal points of a lenticular lens of another autostereoscopic display device.

FIG. 5A is a schematic cross sectional view showing, for a range of viewing angles, the focal points of a lenticular lens 11 of the autostereoscopic display device described above with reference to FIGS. 4A and 4B. For collimated light, the focal length of a practical lens design varies with the angle of incidence of the light. Thus, in practice, the focal points of the lens 11 define a curved "focal surface" 13, as shown in the Figure.

Figure 5B:
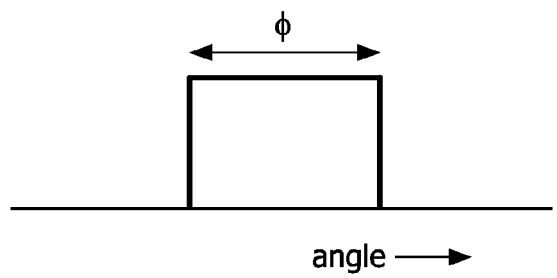
FIGS. 5B, 5C and 5D are diagrams for explaining the effect of the focal points on the operation of the autostereoscopic display device.
Figure 5C:
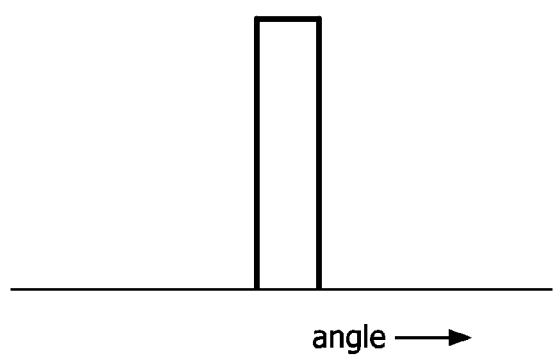
Figure 5D:

At the normal viewing angle, the lens 11 is defocused so that the focal point 15 lies behind the plane of the display panel 3. In particular, the focal point 15 is arranged so as to provide a folding of the angular distribution with a block function having a width equal to the angle between adjacent views projected by the lens 11, φ. This function is illustrated in FIG. 5B, and is the same as that explained above with reference to FIGS. 4A and 4B. Thus, at and around the normal viewing angle, the brightness non-uniformities caused by imaging of the black matrix are almost completely eliminated, and the modulation depth is as shown in FIG. 3C.

At some larger viewing angle, the focal point 17 of the lens 11 substantially coincides with the plane of the display panel 3. At this viewing angle, the focal point 17 provides substantially no folding of the angular distribution, as illustrated by the narrow block function shown in FIG. 5C. Thus, at and around this viewing angle, the brightness non-uniformities caused by imaging of the black matrix are barely reduced, and the modulation depth is similar to that shown in FIG. 3B.

At some even larger viewing angle, the focal point 19 of the lens 11 lies in front of the plane of the display panel 3. At this viewing angle, the focal point 19 provides significant folding of the angular distribution, as illustrated by the block function shown in FIG. 5D. Thus, at and around this viewing angle, the brightness non-uniformities caused by imaging of the black matrix are almost completely eliminated, and the modulation depth is substantially zero, as shown in FIG. 3C.

Figure 6:
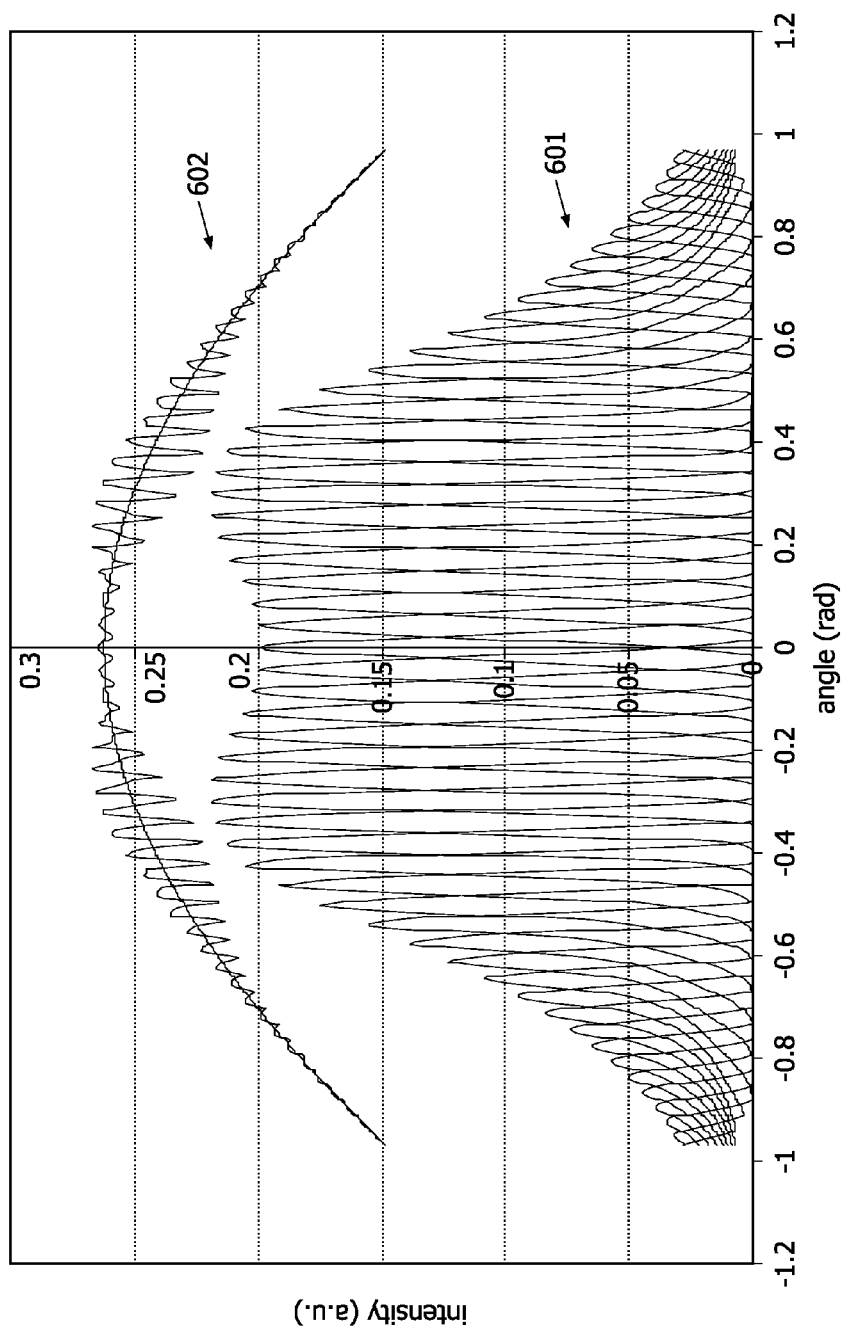
FIG. 6 is a graph showing brightness non-uniformities as a function of viewing angle for the autostereoscopic display device to which FIGS. 5A to 5D relate.

FIG. 6 is a graph showing brightness non-uniformities as a function of viewing angle for the autostereoscopic display device to which FIGS. 5A to 5D relate. The lower plot 601 shows the individual brightness intensity contributions of the individual views interposed between the dark bands caused by imaging of the black matrix. The upper plot 602 shows the cumulative effect of the contributions of the individual views, that is to say the brightness levels observed by the user moving across the front of the display. It can be seen from the upper plot that intensity modulation depth is low at and around normal viewing angles, but increases to significant and distracting levels at viewing angles in the range between 10° and 35°. At viewing angles of larger than 35°, the intensity modulation depth returns to lower levels.

Thus, even though the lenticular lenses 11 of an autostereoscopic display device might be defocused to minimize brightness non-uniformities, essentially by extending the focal length of the lenses 11, for practical applications there will still be a range of viewing angles for which the lenticular lenses 11 will be substantially in focus and consequently for which the brightness non-uniformities will be significant and distracting for a user.

The present invention recognizes this problem and solves it by providing a brightness non-uniformity reducing function according to which the outputs of display pixels are spread (i.e. diverged) in order to "close" the dark bands caused by imaging of the black matrix. The brightness non-uniformity reducing function defines a pitch which is less than the pitch of the lenticular lenses providing the view forming means. In this way, the view forming and brightness non-uniformity reducing functions may be decoupled, and the outputs of the display pixels corresponding to the different views can be spread sufficiently, for a large range of viewing angles, to thereby minimizing the brightness non-uniformities caused by imaging of the black matrix.

Figure 7:
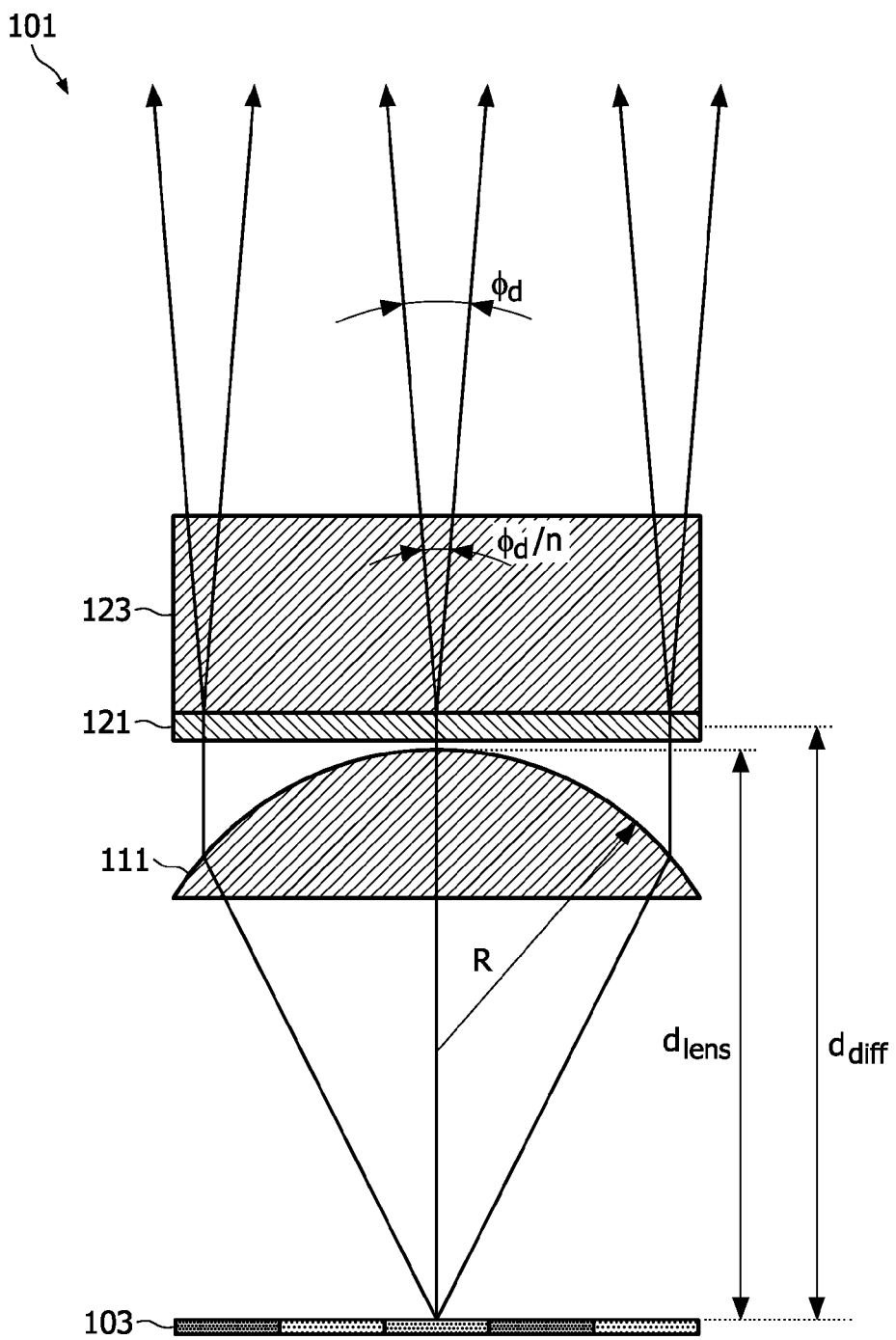
FIG. 7 is a schematic cross sectional view showing a first autostereoscopic display device according to the invention.

FIG. 7 is a schematic cross sectional view showing a first autostereoscopic display device 101 according to the invention. With reference to this Figure, the first device 101 according to the invention is similar in general structure to the device 1 described above with reference to FIGS. 1 and 2. Thus, the device 101 comprises a display panel 103 performing an image forming function, a light source (not shown) for the display panel 103, and a lenticular sheet performing a view forming function. The display panel 103 and the light source in particular are identical to those described above.

The device 101 shown in FIG. 7 is also similar to the device described above with reference to FIGS. 4A to 5D. Thus, the lenticular lenses 111 of the device 101 are slanted at an acute angle relative to the column direction of the display panel 103. The lenticular lenses 111 differ from those of the device 1 described with reference to FIGS. 4A to 5D in that their focal points (for normally incident collimated light) coincide with the plane of the display panel 103, that is to say the lenses 111 are designed to be in focus. Thus, the focal length of the lens (for normally incident collimated light), $f_{lens}$, is equal to the separation between the planes of the display panel 103 and lenticular sheet 109, $d_{lens}$.

The device 101 shown in FIG. 7 also differs from the device 1 described with reference to FIGS. 4A to 5D in that it additionally comprises a holographic diffuser 121 formed on a glass substrate 123 for providing a brightness non-uniformity reducing function. The holographic diffuser 121 is arranged over and in registration with the lenticular sheet 109, so that the glass substrate 123 faces away from the lenticular sheet 109.

The holographic diffuser 121 and glass substrate 123 are together configured so that they spread (i.e. diverge) the outputs of the display pixels projected by the lenticular sheet 109 with an ideal block function. In particular, an effective spreading angle of the holographic diffuser 121 and glass substrate 123, $\phi_d$, in a plane perpendicular to the axes of the lenticular lenses is configured to be equal to the angle $\phi$ between adjacent views projected by the lenticular sheet 109. The actual spreading angle of the holographic diffuser 121, $\phi'_d$, is $\phi$ divided by the refractive index n of the glass substrate 123.

This spreading of the outputs of the display pixels minimizes the brightness non-uniformities caused by imaging of the black matrix, while at the same time restricting cross-talk to acceptable levels. Because the brightness non-uniformity reducing function provided by the holographic diffuser 121 is not viewing angle-dependent, or is only slightly viewing angle-dependent, the brightness non-uniformities are minimized for a large range of viewing angles.

The holographic diffuser 121 and glass substrate 123 are also configured so that they transmit the outputs of the display pixels projected by the lenticular sheet 109 with substantially no spreading in the plane parallel to the axes of the lenticular lenses. In this way, unnecessary blurring of the views may be avoided.

The design and manufacture of suitable holographic diffusers will be well known to those skilled in the art.

Figure 8:
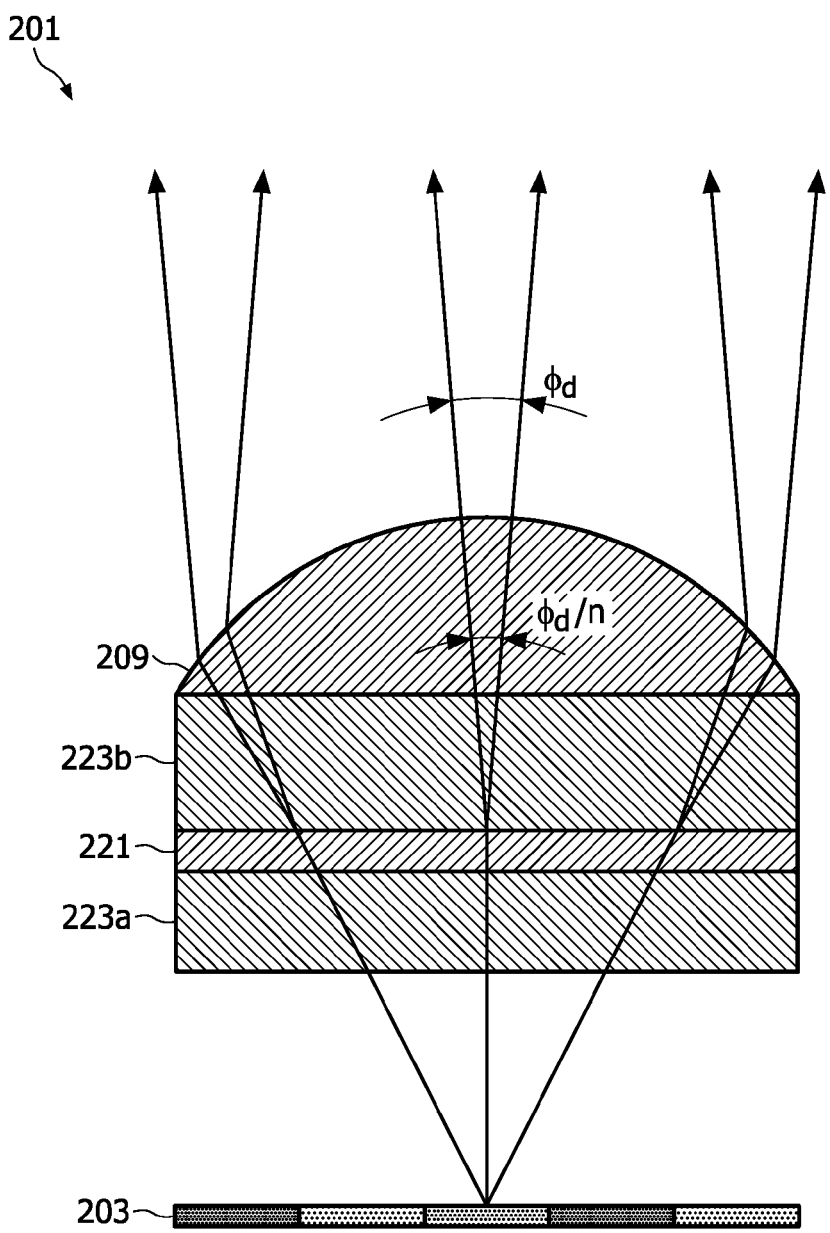
FIG. 8 is a schematic cross sectional view showing a second autostereoscopic display device according to the invention.

FIG. 8 is a schematic cross sectional view showing a second autostereoscopic display device 201 according to the invention. With reference to this Figure, the second device 201 according to the invention has the same structure as the first device 101 described with reference to FIG. 7, except that the brightness non-uniformity reducing function is provided by a holographic diffuser 221 sandwiched between a pair of glass substrates 223a, 223b, which holographic diffuser 221 and glass substrates 223a, 223b are provided between the display panel 203 and the lenticular sheet 209.

The second device 201 shown in FIG. 8 also operates in a similar manner to the device 101 described with reference to FIG. 7. However, the spreading of the outputs of the display pixels by the holographic diffuser 221, for the purpose of minimizing brightness non-uniformities, occurs prior to the projection of the outputs in different directions by the lenticular sheet 209.

Thus, the effective spreading angle of the holographic diffuser 221 and glass substrates 223a, 223b, $\phi_d$, in a plane perpendicular to the axes of the lenticular lenses is again configured to be equal to the angle $\phi$ between adjacent views projected by the lenticular sheet 109. Assuming a homogeneous medium between the display pixels and the holographic diffuser 221 and between the holographic diffuser 221 and the lenticular sheet 209, the actual spreading angle of the holographic diffuser 121, $\phi'_d$, is given by the following equation:

$$\phi'_d = \frac{\phi}{n} \cdot \frac{d_{lens}}{d_{diff}}$$

where n is the refractive index of the homogeneous glass medium, $d_{lens}$ is the separation between the planes of the display panel 203 and lenticular sheet 209, and $d_{diff}$ is the separation between the planes of the display panel 203 and the holographic diffuser 221.

Figure 9:
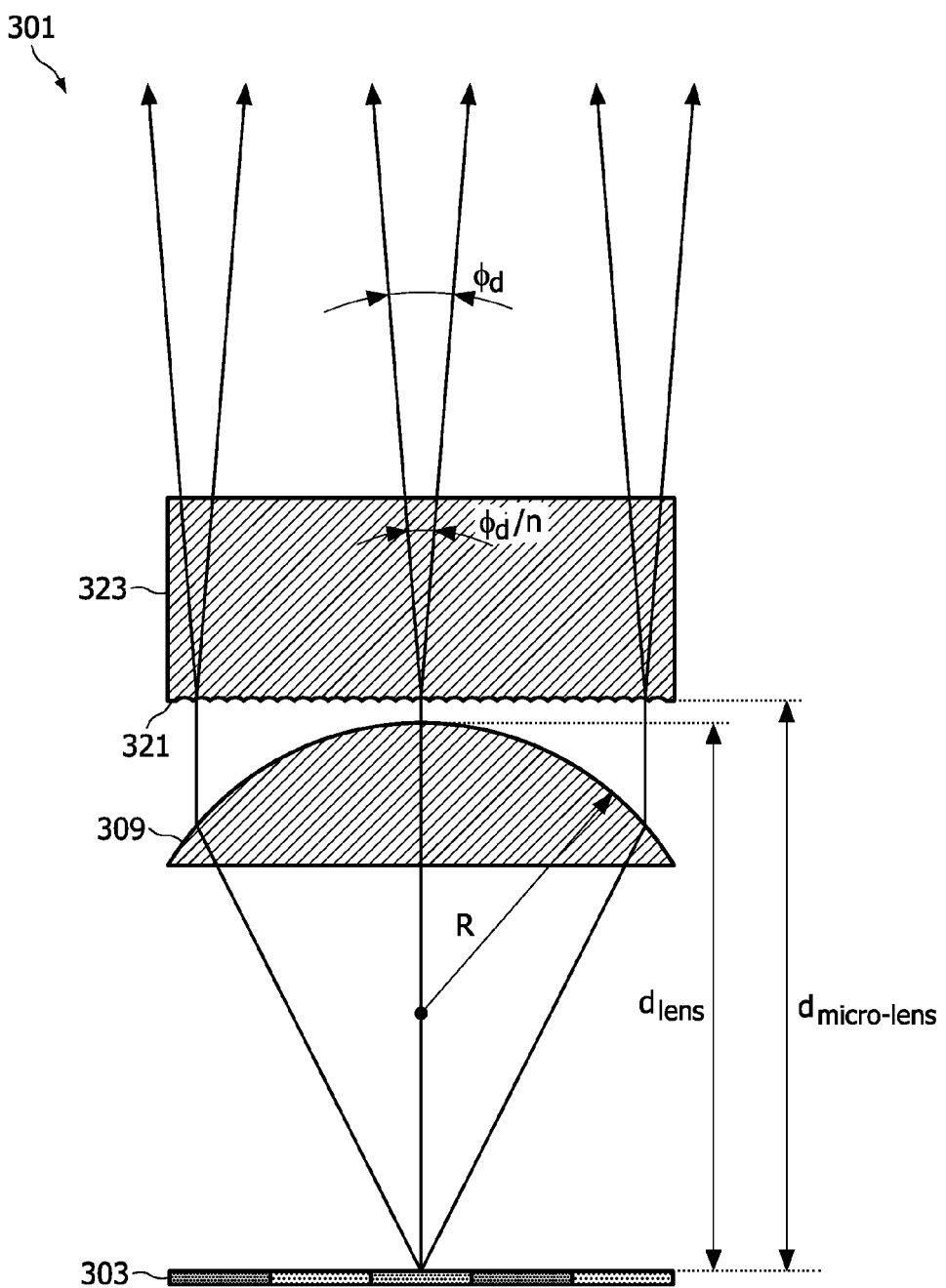
FIG. 9 is a schematic cross sectional view showing a third autostereoscopic display device according to the invention.

FIG. 9 is a schematic cross sectional view showing a third autostereoscopic display device 301 according to the invention. With reference to this Figure, the third device 301 according to the invention has the same structure as the first device 101 described with reference to FIG. 7, except that the brightness non-uniformity reducing function is provided by an array of closely spaced lenticular micro-lenses 321 formed on a glass substrate 323. The array of micro-lenses 321 is arranged over and in registration with the lenticular sheet 309, so that the glass substrate 323 faces away from the lenticular sheet 309.

The array of micro-lenses 321 is formed as a sheet of lenticular micro-elements having a pitch $p_{micro-lens}$ which is a very small fraction of the pitch of the lenticular elements of the lenticular sheet 309. In particular, 36 micro-lenses overlie each lens of the lenticular sheet 309.

The array of micro-lenses 321 and the glass substrate 323 are configured to spread the outputs of the display pixels projected by the lenticular sheet 309 with an ideal block function. In particular, an effective spreading angle of the array of micro-lenses 321 and glass substrate 323, $\phi_d$, in a plane perpendicular to the axes of the lenticular lenses is configured to be equal to the angle $\phi$ between adjacent views projected by the lenticular sheet 309. The actual spreading angle of the array of micro-lenses 321, $\phi'_d$, is $\phi_d$ divided by the refractive index n of the glass substrate 323.

The micro-lenses may have positive or negative focal lengths, $f_{micro-lens}$, and satisfy the following requirement:

$$\frac{p_{micro-lens}}{|f_{micro-lens}|} = \phi_d$$

The spreading of the outputs of the display pixels minimizes the brightness non-uniformities caused by imaging of the black matrix, while at the same time restricting cross-talk to acceptable levels. Because the brightness non-uniformity reducing function provided by the array of micro-lenses 321 is not viewing angle-dependent, or is only slightly viewing angle-dependent, the brightness non-uniformities are minimized for a large range of viewing angles.

The array of micro lenses 321 and glass substrate 323 are also configured so that they transmit the outputs of the display pixels projected by the lenticular sheet 309 with substantially no spreading in the plane parallel to the axes of the lenticular lenses. In this way, unnecessary blurring of the views may be avoided.

Figure 10:
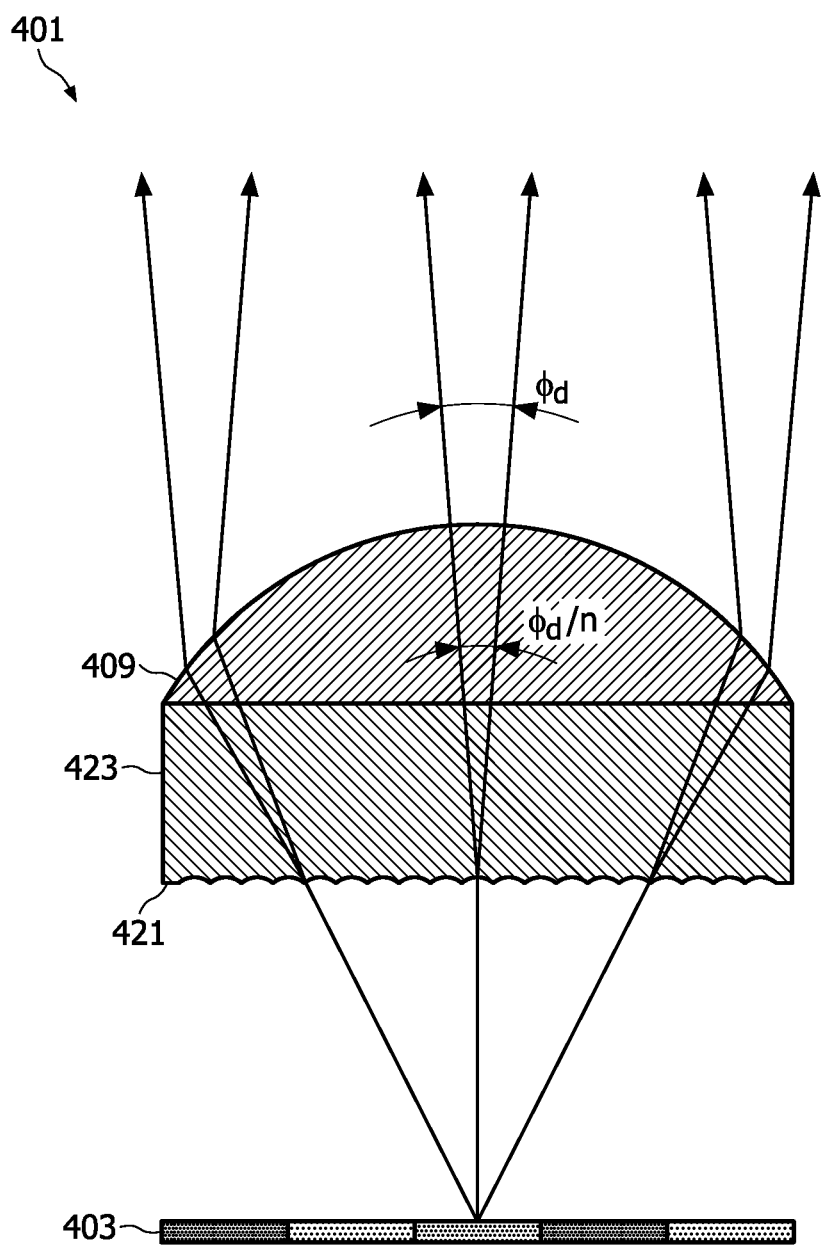
FIG. 10 is a schematic cross sectional view showing a fourth autostereoscopic display device according to the invention.

FIG. 10 is a schematic cross sectional view showing a fourth autostereoscopic display device 401 according to the invention. With reference to this Figure, the fourth device 401 according to the invention has the same structure as the third device 301 described with reference to FIG. 9, except that the array of micro-lenses 421 providing the brightness non-uniformity reducing function is arranged between the display panel 403 and the lenticular sheet 409.

The fourth device 401 shown in FIG. 10 also operates in a similar manner to the device 301 described with reference to FIG. 9. However, the spreading of the outputs of the display pixels by the array of micro-lenses 421, for the purpose of minimizing brightness non-uniformities, occurs prior to the projection of the outputs in different directions by the lenticular sheet 409.

Thus, the effective spreading angle of the array of micro-lenses 421, $\phi_d$, in a plane perpendicular to the axes of the lenticular lenses is again configured to be equal to the angle $\phi$ between adjacent views projected by the lenticular sheet 109. The actual spreading angle of the array of micro-lenses 421, $\phi'_d$, is compensated for both the refractive index n of the glass substrate 423 and the fact that the brightness non-uniformity reducing function is provided before the view forming function.

Figure 11:
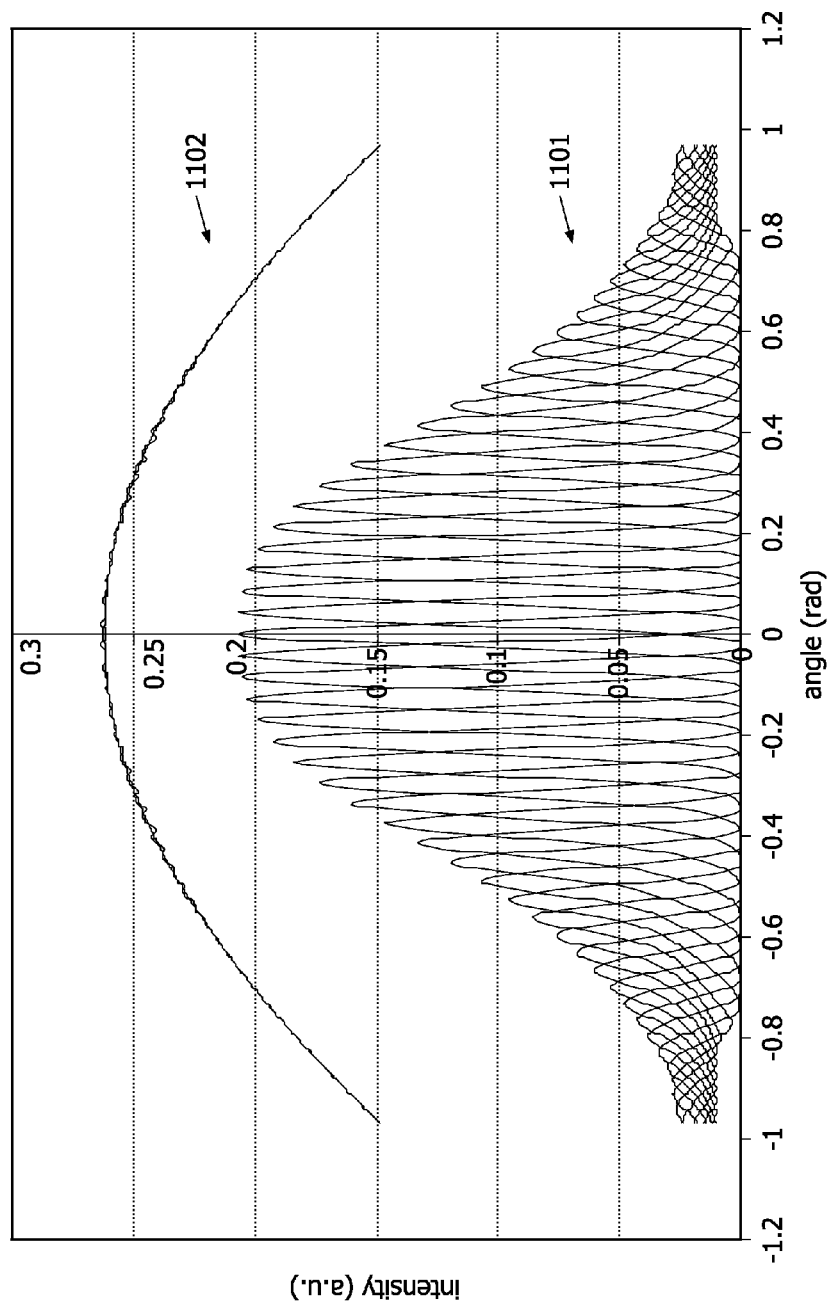
FIG. 11 is a graph showing brightness non-uniformities as a function of viewing angle for the autostereoscopic display devices according to the invention shown in FIGS. 7 to 10.

FIG. 11 is a graph showing brightness non-uniformities as a function of viewing angle for the autostereoscopic display devices described with reference to FIGS. 7 to 10. The lower plot 1101 shows the individual brightness intensity contributions of the individual views interposed between the dark bands caused by imaging of the black matrix. The upper plot 1102 shows the cumulative effect of the contributions of the individual views, that is to say the brightness levels observed by the user moving across the front of the display. It can be seen from the upper plot that intensity modulation depth is advantageously minimized across a large range of viewing angles, including those in the range between 10° and 35°.

Figure 12:
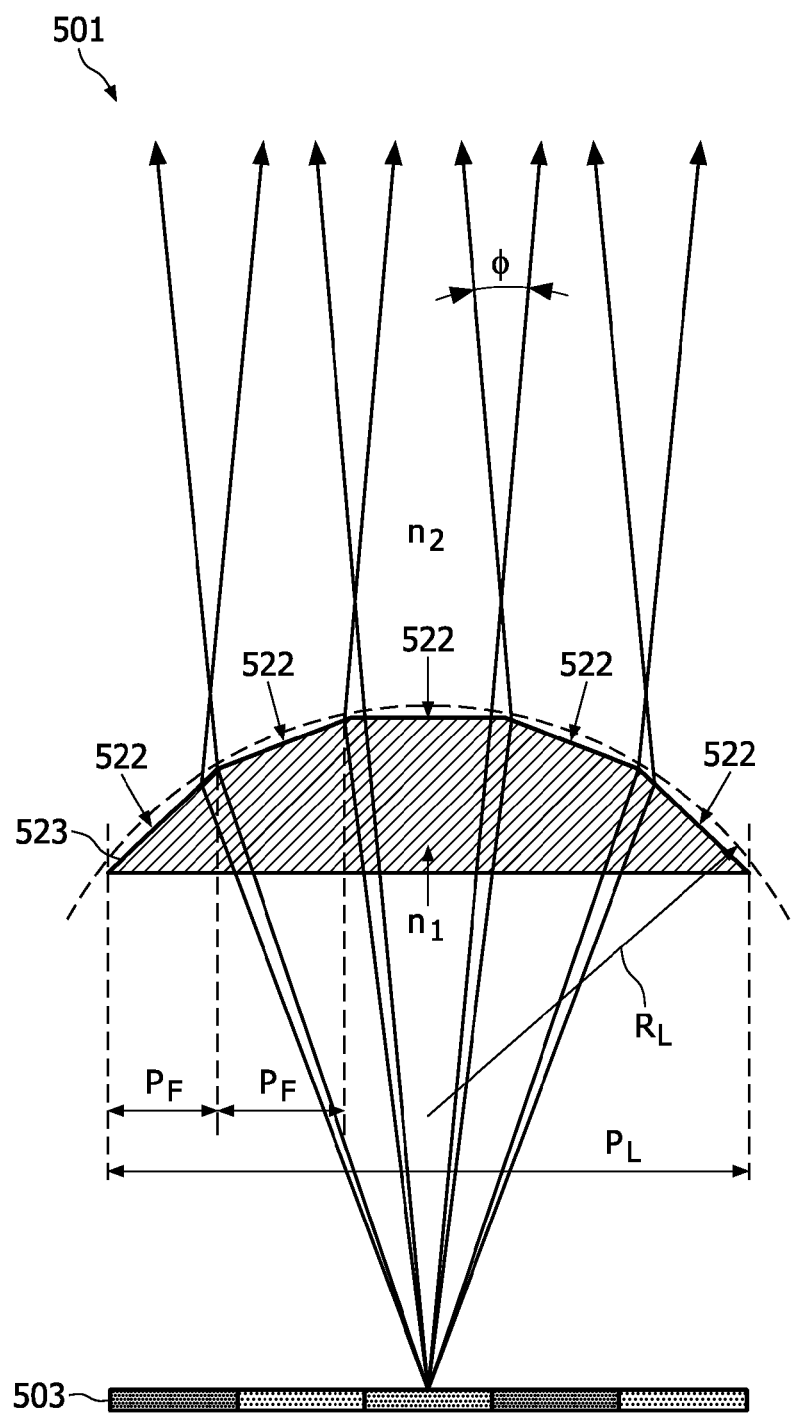
FIG. 12 is a schematic cross sectional view showing a fifth autostereoscopic display device according to the invention.

FIG. 12 is a schematic cross sectional view showing a fifth autostereoscopic display device 501 according to the invention. With reference to this Figure, the third device 501 according to the invention has the same structure as the first device 101 described with reference to FIG. 7, except that the brightness non-uniformity reducing and view forming functions are provided at the same optical interface.

In particular, a second array of lenses providing the brightness non-uniformity reducing function and having a second pitch are merged into a first array of lenses providing the view forming function and having a first pitch larger than the second pitch. For such an arrangement, using simple geometrical optics, the following approximation can be derived:

$$R_{micro-lens} \cdot N_{micro-lens} = R \cdot N_{views}$$

where $R_{micro-lens}$ is the radius of the lenses of the second array, $N_{micro-lens}$ is the number of lenses of the second array per lens of the first array, R is the radius of the lenses of the first array and $N_{views}$ is the number of views provided by the device.

If $N_{micro-lens}$ is selected to be equal to $N_{views}$ then the radii of the lenses of the first and second arrays R, $R_{micro-lens}$ are the same. The resulting geometry is illustrated in FIG. 12, which shows a single array of substantially polygonal lenses 521 providing both the view forming and brightness non-uniformity reducing functions. Each flat surface 522 of each polygonal lens 521 corresponds to a lens of the second array, which array provides the brightness non-uniformity reducing function. The device 501 provides five views.

The spreading of the outputs of the display pixels by the flat surfaces minimizes the brightness non-uniformities caused by imaging of the black matrix, while at the same time restricting cross-talk to acceptable levels. Because the brightness non-uniformity reducing function provided by the array of polygonal lenses 521 is not viewing angle-dependent, or is only slightly viewing angle-dependent, the brightness non-uniformities are minimized for a large range of viewing angles.

In some cases, simple geometrical optics falls short in correctly determining the required number of flat surfaces, $N_{micro-lens}$, and diffraction effects have to be taken into account. In doing so the number of flat surfaces, $N_{micro-lens}$, may be chosen somewhat less than $N_{views}$. Without wishing to be bound by theory, the number of flat surfaces giving minimum brightness non-uniformities may be given by:

$$N_{views} \cdot \frac{1}{1 + \left| \frac{R_L \cdot N_{views}^2}{\Delta n \cdot p_L^2} \lambda \right|}$$

with $\Delta n = n_1 - n_2$ being the difference of the refractive indices $n_1$ and $n_2$ of the materials on either side of the lens surface, $p_L$ the pitch of the polygonal lenses, and $\lambda$ the wavelength of the light used and $R_L$ is the radius of curvature of the first lenses.

In practical situations a whole range of wavelengths is emitted by the display, but a good average value of $\lambda$ is 550 nm for purpose of the above calculation. Alternatively, the wavelength used for the calculation is one of the boundaries of the spectrum of light used for display. For practical designs, the outcome of the equation, $N_{micro-lens}$, can be rounded to either of the nearest integers higher than or lower than the outcome value. Preferably the outcome is rounded to the nearest integer. A practical guideline is to design a display using the above calculation when the value of the modulus in the denominator is greater than around 0.1.

The array of polygonal lenses 521 is also configured so that it transmits the outputs of the display pixels projected by the lenticular sheet 509 with substantially no spreading in the plane parallel to the axes of the first array of lenses. In this way, unnecessary blurring of the views may be avoided.

Figure 13:
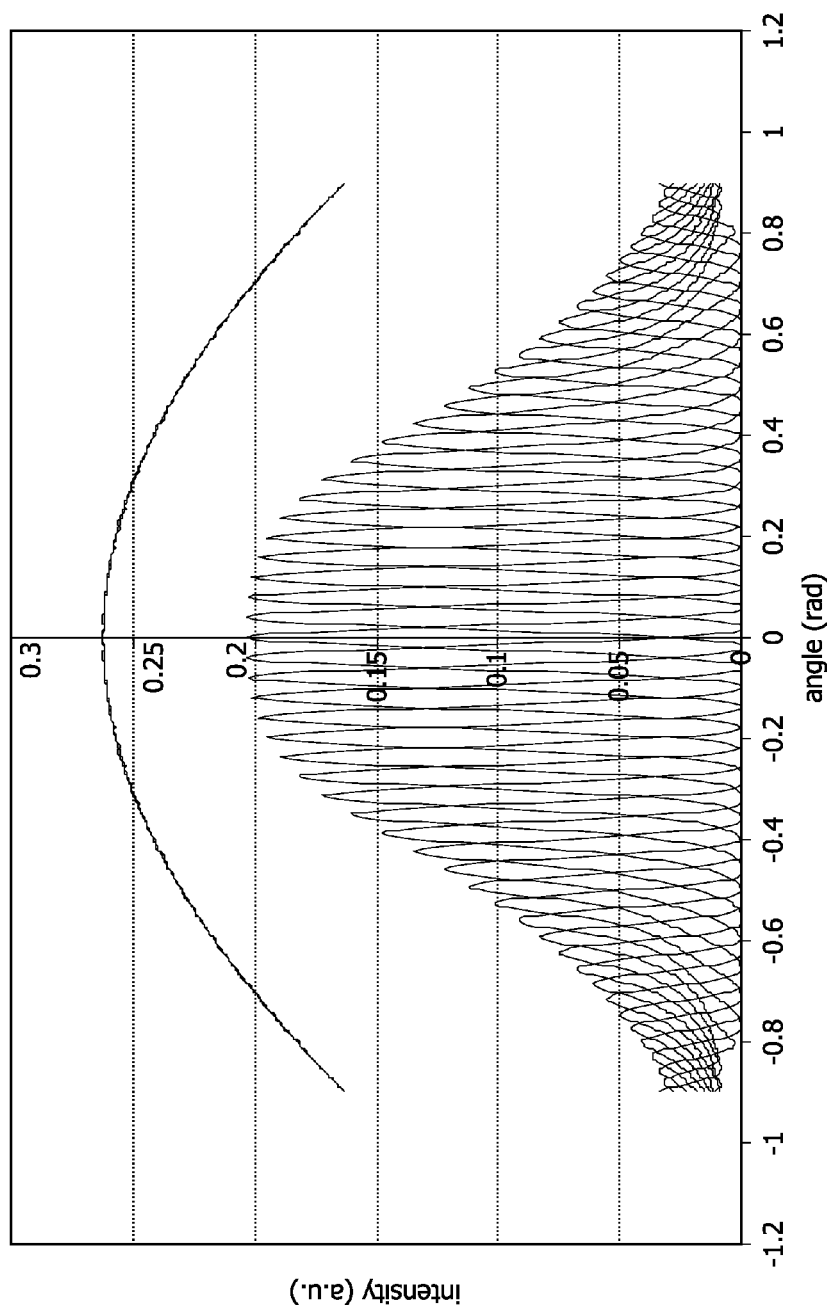
FIG. 13 is graph showing brightness non-uniformities as a function of viewing angle for the fifth autostereoscopic display device according to the invention shown in FIG. 12.

FIG. 13 is graph showing brightness non-uniformities as a function of viewing angle for the fifth autostereoscopic display device 501 according to the invention shown in FIG. 12.

The lower plot 1301 shows the individual brightness intensity contributions of the individual views interposed between the dark bands caused by imaging of the black matrix. The upper plot 1302 shows the cumulative effect of the contributions of the individual views, that is to say the brightness levels observed by the user moving across the front of the display. It can be seen from the upper plot that intensity modulation depth is advantageously minimized across a large range of viewing angles, including those in the range between 10° and 35°.

Figure 14A:
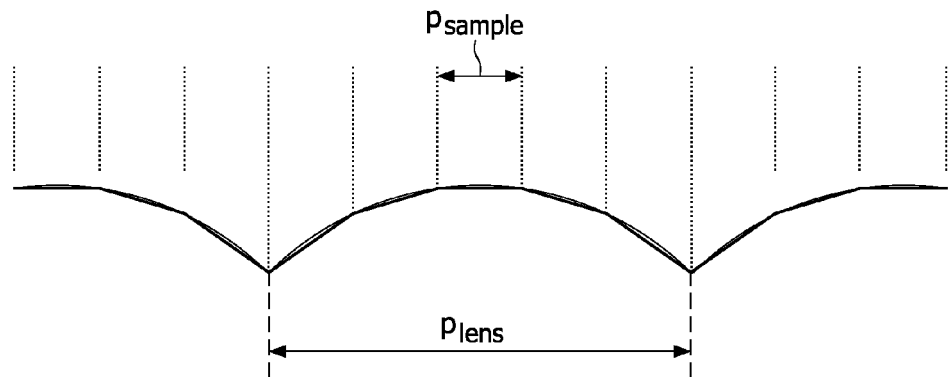
FIGS. 14A and 14B are diagrams for explaining modifications to the fifth autostereoscopic display device according to the invention shown in FIG. 12.
Figure 14B:
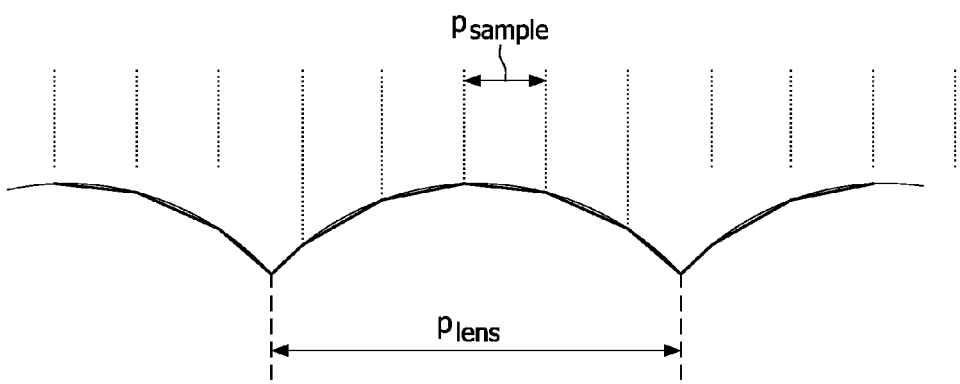

FIGS. 14A and 14B are diagrams for explaining modifications to the fifth autostereoscopic display device according to the invention shown in FIG. 12. These Figures show envelope curves by which the geometry of the polygonal lenses is defined. The envelope curves are segments of circles, although non-circular envelope curves may also be provided. The geometry of the polygonal lenses is defined by sampling the envelope curve at fixed intervals $P_{sample}$. In a preferred embodiment, the following relationship applies:

$$P_{sample} = P_{lens} \cdot (n/N_{views})$$

where $p_{lens}$ is the pitch of the polygonal lenses, n is a positive integer, and $N_{views}$ is the number of views provided by the device.

In some embodiments, the intersection between adjacent envelope curves defines a sampling point for the polygonal lens, as shown in FIG. 14A. In other embodiments, the sampling points do not coincide with the intersection between adjacent envelope curves, as shown in FIG. 14B.

In a sixth embodiment according to the invention a device has a combination of not one but more than one additional micro-lens arrays for providing the brightness non-uniformity function. For example two micro lens arrays may be present.

Figure 15A:
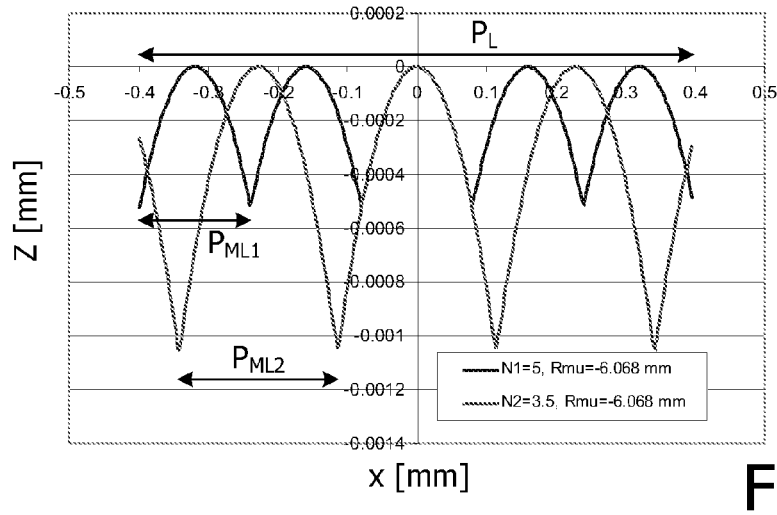
FIGS. 15A, 15B and 15C shows cross sections of two micro-lensarrays to counter moiré where

In the particular example of FIG. 15A the device according to the invention has two micro-lens arrays 1501 and 1502 of which the micro lenses have a radius of curvature twice that of the lenticular lenses (first lens array also denoted with view forming lens array) and their refractive surface curvature is opposite to that of the lenticular lenses ($R_{microlens} = -2R_L$. While the microlenses ML1 of array 1501 have a pitch $P_{ML1}$ that is 5 times smaller than the pitch of the lenticular lenses $P_L$ (the), the lenses ML2 of lens array 1502 have a pitch $P_{ML2}$ that is 3.5 times smaller than $P_L$. The contours of the crossections of these lens arrays are indicated in FIG. 15A where the vertical axis, represents the z dimension of a crossection of a lens (the direction in which the thickness of the lens is measured) and the horizontal axis represents the width dimension x of a lens. Hence, in this example $P_L = 0.8$ mm, $P_{ML1} = 0.8/5$ mm and $P_{ML2} = 0.8/3.5$ mm.

Figure 15B:
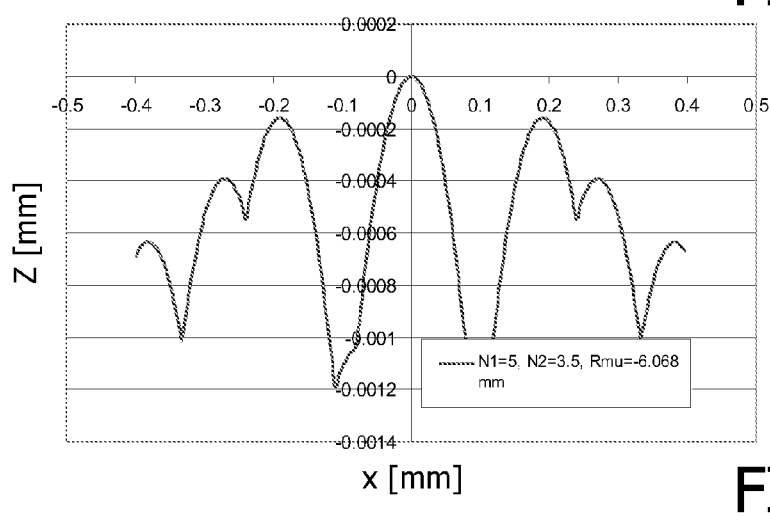
Figure 15C:
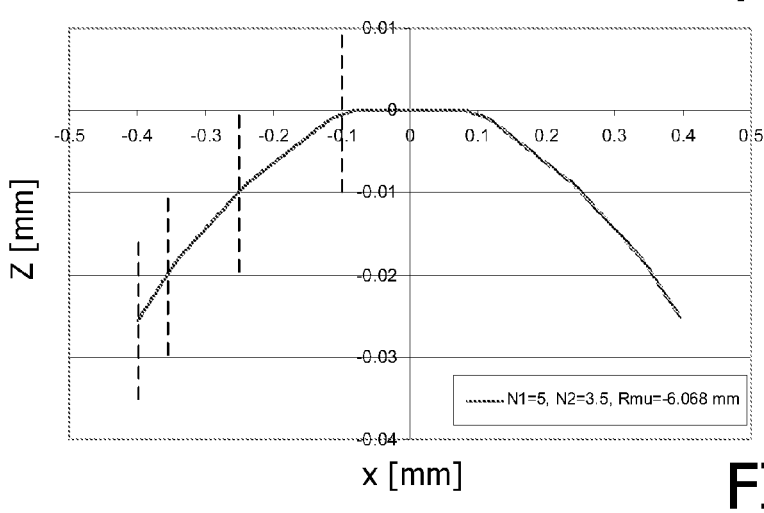

In a further variation of this embodiment, these two arrays of lenses 1501 and 1502 may be integrated into one micro lens array by superposition of the two micro lens arrays. In that case the contour of the single lens array that results is represented by 1503 in FIG. 15B. In yet a further variation, the two lens arrays may be integrated together and also with the lenticular lens array (view forming first lens array). In that case the contour of the resulting lenticular lens array is such that it show flat facets with unequal width (measured in the x direction), as can be observed from the lens cross section of FIG. 15C.

Figure 16:
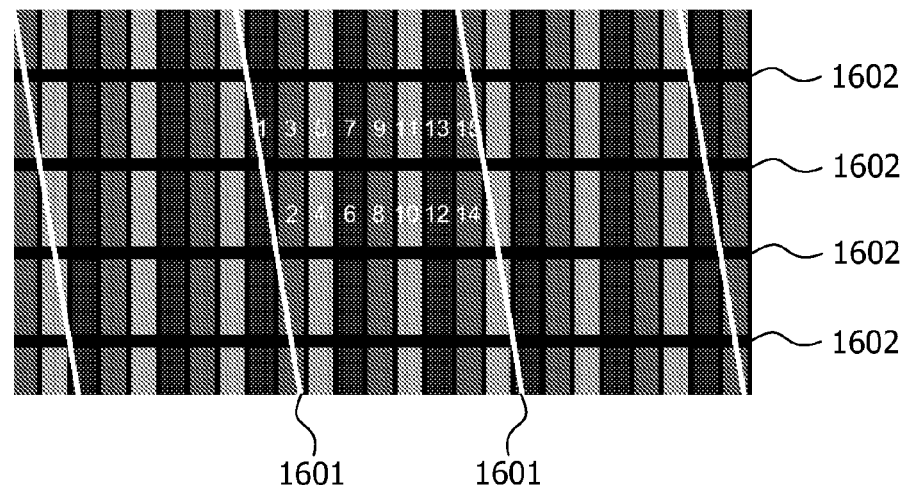
FIG. 16 represents a front view of a 15-view 3D display based on a slanted lenticular in front of a sub-pixelated display panel.
Figure 17:
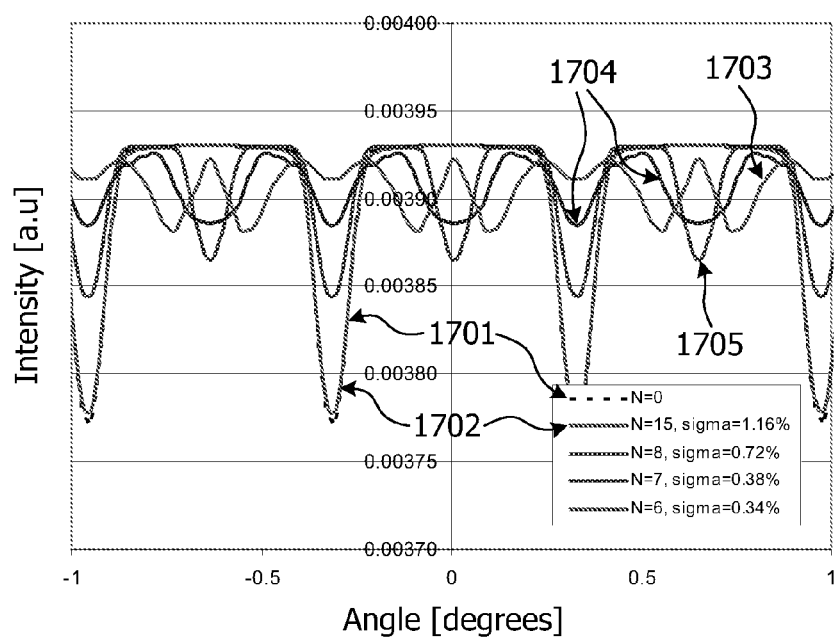
FIG. 17 shows intensity of display light as a function of viewing angle for various displays based on FIG. 16 with or without microlenses and with or without taking account of diffraction in determining the number of microlenses or facets.

The effect of the use of multiple micro lens arrays as described in the previous paragraphs is indicated with reference to FIGS. 16 and 17. FIG. 16 shows a front view layout of a 15-view 3D 42' display (full-HD: 1920×1080 pixels) with a lenticular (first lens array) slanted at an angle of a tan(1/6) with respect to the column direction of the sub-pixels(. The lines 1601 indicated the edges of the lenticular array (first lens array). The particulars of the lenticular array are as follows $n_1 = 1.52$, $n_2 = 1$ (i.e. air), the lenticular pitch $P_L = 0.798$ mm, and the radius of curvature of the lenticular lenses mm. With reference to FIG. 16, the display is designed to have 15 views, i.e. $N_{views} = 15$, in which Figure for a number of sub-pixels 1 to 15 their view contribution is indicated by the numbers 1 to 15. The black matrix 1602 amounts to 25% of the sub-pixel pitch measured in both the vertical and horizontal direction. In, subsequent calculations λ=550 nm as the design wavelength, unless stated otherwise.

FIG. 17 shows calculated graphs of intensity as seen by a viewer when watching a certain location on the display as a function of the angle at which this location is watched. The graphs of FIG. 17 are the results of ray tracing taking into account diffraction in the so-called Fresnel-Kirchhoff approximation. The intensity of the graph 1701 (dotted line) is not constant which is typical for moiré interference (banding) in a display as without making use of the present invention. The moiré disturbance as represented by the standard deviation represented by sigma value is in this case 1.2%. When applying the invention using simple geometrical optics the number of lenses in the second array or the number of flat faces in the lenticular would be required to be equal to the number of views, i.e. 15. As can be seen in FIG. 17, the graph 1602 (solid line) representing this solution almost overlies the dotted line 1701, i.e. the improvement is only small as the sigma is reduced to 1.16%. This is due to the fact that in this case simple geometrical optics do not suffice and diffraction must be taken into account during determination of the number of microlenses or flat faces. This can be done according to the formula given here above by reducing the number of microlenses or increasing their pitch. Graphs 1603 to 1605 represent various situations where N=6 to 8. The formula given above, that takes into account diffraction, results in a device having a number of microlenses per lenticular or a number of flat facets per lenticular of N=7, which is very close to the optimum obtained with N=6. As can be seen the improvement is better than without taking into account diffraction since the sigma value now drops below 0.8% for N=8, 0.41% for N=7 and in the best case N=6 even to 0.34%.

Figure 18:
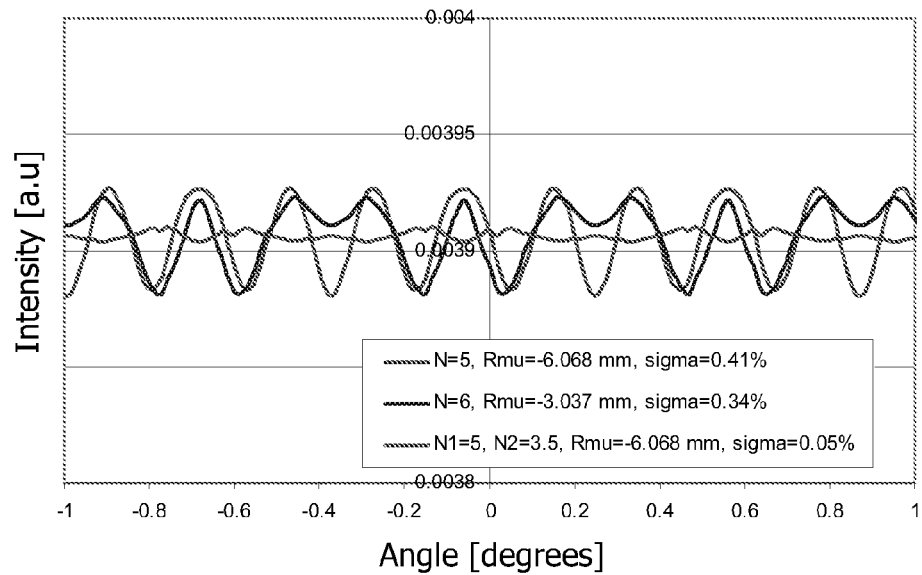
FIG. 18 shows intensity of display light as a function of viewing angle for various displays based on FIG. 16 with a number of microlenses and flat-facets determined taking account of diffraction and with and without unequal width of the microlenses or flat facets.

The graph of N=6 is reproduced in FIG. 18 and is denoted by 1801. Also drawn is the graph 1802 representing a device having the two microarrays as described with reference to FIG. 15. Thus, one of the two micro arrays has N1=5 and the other has N2=3.5. In this case, the amount of moiré is reduced even further as observed from the even lower sigma value 0.05%.

The optimized layout of FIG. 15, works well for the design wavelength of λ=550 nm (=green), but also at other wavelengths in the visible spectrum such as λ=630 nm (=red) and λ=470 nm (=blue). The sigma value with these three wavelengths is approximately the same.

In yet further embodiments of the invention a standard lenticular array with curved refractive surface and without facets is combined with one or more lens arrays in such a way that the radius of curvature of the micro-lenses differs (in magnitude) from that of the lenticular lenses. When such microlenses are physically combined into the lenticular array, the lenticular array would not end up having flat facets, but curved factes.

Without wishing to be bound by theory, geometrical optics requires that the angular spacing between two neighbouring views $\Delta\theta$ equals the pitch of the microlens of the microlensarray divided by the focal length of the microlens arrays f; i.e. $\Delta\theta = P_{mL}/f_{ML}$. In approximation, the focal length is equal to the radius of curvature of the microlens $R_{ML}$ divided by the difference in refractive index of the materials $n_1$ and $n_2$ forming the refractive surface of the microlens, i.e. $f_{ML} = |R_{ML}/(n_1 - n_2)|$. Note that when the microlens is incorporated such that a faceted lenticular results, the refractive indices also refer to the materials of the faceted lens. Presuming there are N microlenses (or facets) per lenticular lens and noting that the pitch of the lenticular lens is equal to the number of facets times the pitch of the microlens, $P_L = N P_{ML}$, it can be deduced that:

$$\Delta\theta = P_L \left| \frac{(n_1 - n_2)}{NR_{ML}} \right|$$

Hence, in order to achieve a certain angular spacing between two neighbouring views, according to geometrical optics it does not matter whether there are many micro-lenses N in combination with a small radius of curvature of each micro lens $R_{ML}$, or few micro-lenses in combination with a large radius of curvature $R_{ML}$. In practise, as described here before, diffraction phenomena become important when the microlenses are small, i.e. have a small width (in relation to the wavelength of light used). One preferred approach may therefore be to choose the smallest number of micro-lenses (or facets) that is acceptable from a perception point of view, perception being related to amongst others the desired angular spacing between the views. Subsequently, the number of facets N is setto a value, which if diffraction is of importance, is preferably done using the equation given here above for taking into account diffraction. Then after setting N, the radius of curvature $R_{ML}$ of the micro-lenses, or facets if the micro lenses are incorporated in the lenticular, are determined and set. This procedure may, depending on the choices made to achieve the best viewing experience as desired by perception, result in a device that has micro-lens array integrated into the lenticular, such that the facets of the lenticular are not flat but curved.

Figure 19A:
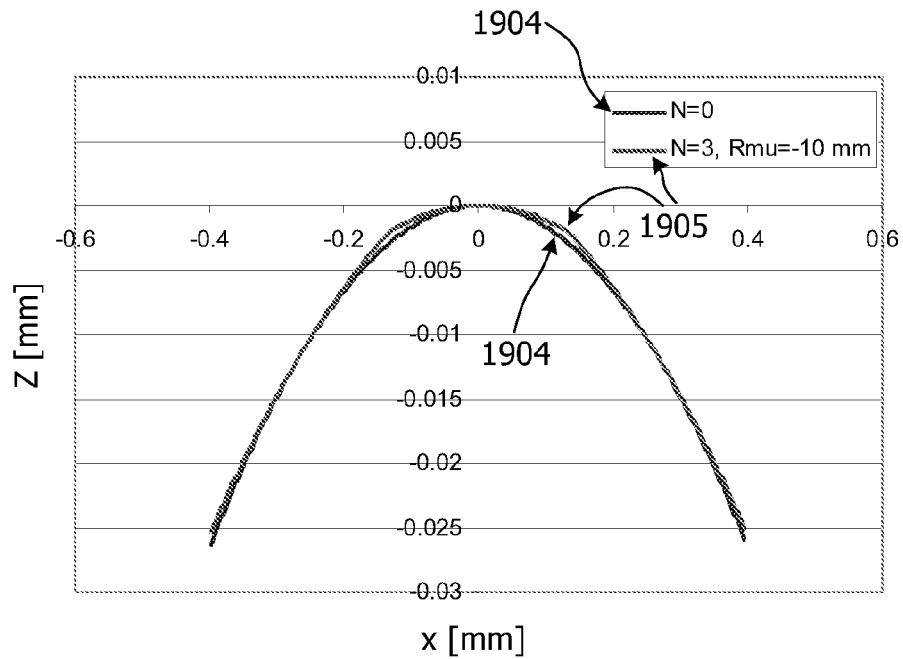
FIGS. 19A and 19B respectively show angular distribution of intensity in a single view for the combination of a lenticular with a micro-lens array that results in non flat facets if combined and cross sections of two micro-lens arrays with and without microlens arrays.
Figure 19B:
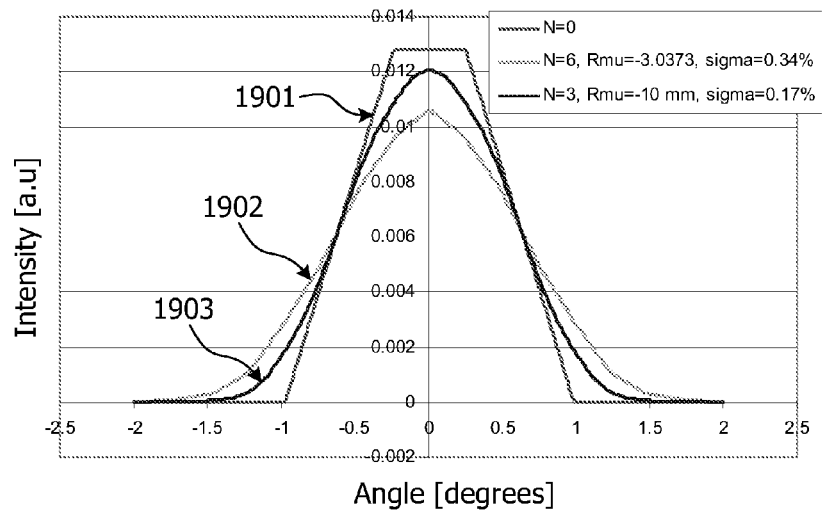

FIGS. 19A and 19B shows the intensity profile of a single view and the shape of lenticulars with and without integrated microlenses for comparative purpose. In FIG. 19A Graph 1901 relates to N=0, i.e. regular lenticular with a crosssectional shape according to graph 1904 in FIG. 19B. Graph 1902 relates to microlens array N=6 with $R_{ML} = -R_L = -3.0373$ mm, where all micorlensees have equal width. When such microlenses are incorporated in the lenticular array, the lenses of the lenticular array have flat facets. The graph indicates the lowest amount of moiré of 0.34% achieved with such microlenses or facets. The graph 1903 relates to N=3 with $R_{ML} = -10$ mm and equal width of the microlenses. When integrated into the lenticular lenses, this results in non-flat facets, so that the crosssectional shape of a lenticular with integrated microlenses is according to graph 1905 in FIG. 19B. The amount of moiré of 0.17% is even lower than that of the example having flat facets. Moreover, as witnessed by the results shown in FIG. 19A, advantageously, the broadening of the individual view obtained with a device that corresponds to a lenticular with non-flat facets (graph 1903) is considerably less than that of views obtained with a device corresponding to lenticulars with flat facets (graph 1902).

In general, it is thus preferred, but not mandatory in some cases, that the number of micro-lenses or a number of facets is kept as small as possible, while adapting the radius of curvature for such microlenses in order to minimize moiré. In this manner diffraction is most limited. Preferably, N>1 and N<10. More preferred is a device with N>2 and N<5.

Figure 20:
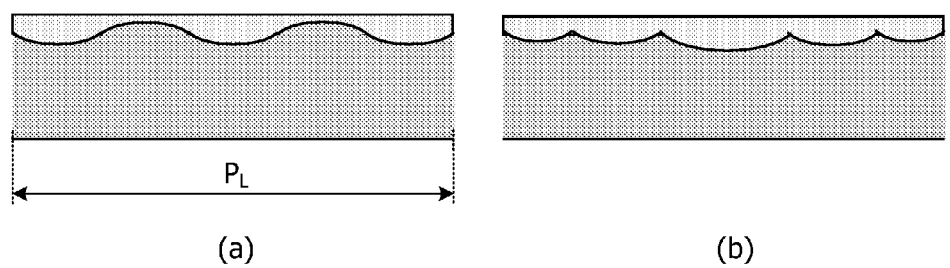
FIG. 20 shows a number of alternative layouts for microlens arrays.

It will be clear that combinations of embodiments as described above may be used. Thus, with reference to FIG. 20, neighbouring microlenses in a device can have the same strength but opposite sign (concave and convex lenses) as depicted in a micro lensarray 2001. This reduces diffraction as the period of the microlenses is enlarged, if the microlenses have the same pitch, the period has doubled. Alternatively, the micro lenses can have the same pitch, but different strength or have the same strength and different pitch, or have different strength and pitch.

In another embodiment according to the invention, the pattern micro lenses are slanted with respect to the lenticulars or when integrated the facets integrated into the lenticular is slanted in orientation with respect to the orientation of the lenticular. In case there are only few facets for each lens, the spatial pattern of pixels within each view as observed by a viewer can have an unfavourable distribution; unfavourable in the sense that the pattern is not pleasant to look at due to for example the occurrence of beat patterns in colour. This effect can be averaged out by slanting of the micro lenses or the pattern of facets with respect to the lenticular lenses.

Lenses need not be spherical, i.e. aspherical lenses may be used to reduce aberrations as known in the art.

The one or more micro lens arrays may be separate from the lenticular lens array or integrated with the lenticular lens array resulting in the faceted lenticular. The latter will have advantages in that only one lens array has to be manufactured and the resulting device will be thinner and/or lighter in weight.

Although many of the examples have been described starting from a slanted lenticular. The invention with similar effect can be used for non-slanted lenticulars, or any other type of lenticular within the scope of the field of the invention.

The lenses of the invention can be made using ablation techniques and/or moulding techniques as known in the art.

Figure 21A:
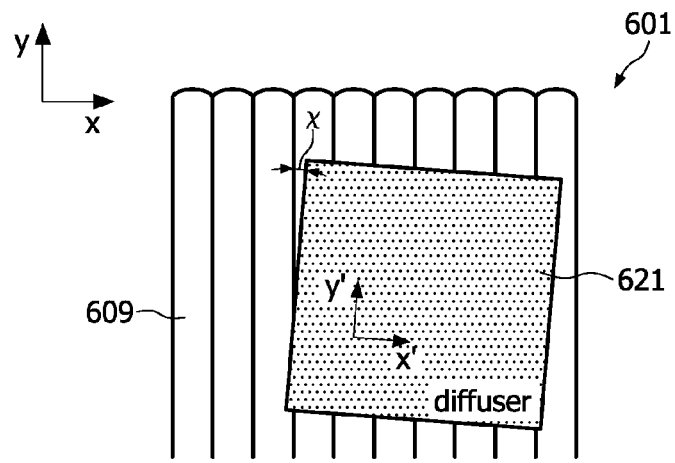
FIGS. 21A, 21B and 21C are diagrams for explaining a sixth autostereoscopic display device according to the invention.
Figure 21B:
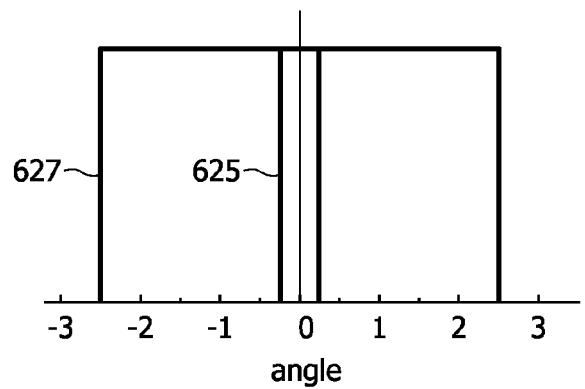
Figure 21C:
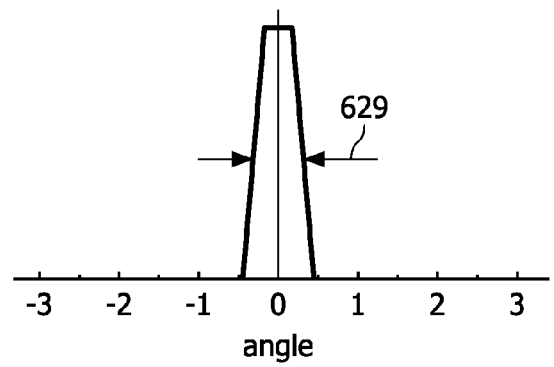

FIGS. 21A to 21C are diagrams for explaining a further autostereoscopic display device 601 according to the invention. With reference to this Figure, the sixth device 601 according to the invention has the same structure as the first device 101 described with reference to FIG. 7, except that the holographic diffuser 621 provides different effective spreading angles 625, 627 in first and second perpendicular planes x'-z, y'-z. In particular, as illustrated in FIG. 21B, the effective spreading angle 625 in the first plane x'-z is 0.5° and the effective spreading angle 627 in the second plane y'-z is 5°. The holographic diffuser 621 may be configured to provide other effective spreading angles, the only requirement being that the effective spreading angle in one plane is smaller than the angle $\phi$ between adjacent views projected by the lenticular sheet 609 and the effective spreading angle in the other plane is greater than the angle $\phi$.

Furthermore, the holographic diffuser 621 is rotated about the z axis (extending into the page) so that the axes y of the lenticular lenses and the axis y' of the holographic diffuser 621 together define an angle x. In this way, the diffuser characteristic can be tuned. For example, as the holographic diffuser 621 is rotated, the folding function becomes trapezoid-shaped, as illustrated in FIG. 21C. When the width 629 at half-maximum equals the angle between views φ, the brightness non-uniformities caused by imaging of the black matrix are minimized.

As well as providing for tuning of the spreading characteristic, the arrangement described with reference to FIGS. 21A to 21C allows for a single holographic diffuser layer to be manufactured for a plurality of different autostereoscopic display devices, with the layer being rotated by different angles to suit the specific parameters of each display. For example, spreading angles in the range from 0.5° to 5° may be achieved using the holographic diffuser 621 described with reference to FIGS. 21A and 21B.

A preferred embodiment of the invention has been described above. However, it will be understood by those skilled in the art that various changes and modifications may be made without departing from the scope of the invention.

It is envisaged that lenticular sheet may additionally be implemented by other means, for example by employing graded index (GRIN) lenses or cells comprising electro-optic materials such as liquid crystal. The lenses of the lenticular sheet need not be slanted.

Embodiments of the invention comprising a holographic diffuser have been described above. In other embodiments, the holographic diffuser may be substituted for other types of surface diffuser, such as engineered diffusers, or scattering diffusers.

Fresnel reflections (losses) at the air interface of surface diffusers, which reflections may cause a reduction of daylight contrast of the autostereoscopic display device, can be reduced by interfacing the surface diffuser with a medium having an appropriately matched refractive index.

In embodiments in which the display panel is a liquid crystal display panel, the linearly polarized output may be exploited to enhance daylight contrast of the device. This may be achieved by making the scattering layer sensitive to the polarization direction.

For example, a surface diffuser having a refractive index of $n_{dif}$ may interface with a birefringent medium, such as a liquid crystal material, which is characterized by ordinary and extraordinary refractive indices $n_o$, $n_e$. $n_o$ may be matched to the refractive index of the diffuser, with $n_e$ being higher than the refractive index of the diffuser. The birefringent medium is then oriented such that the extraordinary refractive index will apply to light from the display, so that this light undergoes diffusion into two directions. Ambient light falling on the display is not polarized, such that the ordinary and extraordinary refractive indices apply equally. Thus, only half of the ambient light will encounter an interface and be partly reflected, thus reducing the daylight contrast. The other half of the ambient light will not encounter an interface and will not therefore be reflected. Such an embodiment improves daylight contrast by a factor of two.

Other embodiments comprising birefringent mediums are also envisaged.

In some embodiments, first and second arrays of lenses providing the view forming and brightness non-uniformity reducing functions are merged into a single optical interface, such in the embodiment described above comprising an array of polygonal lenses. In other such embodiments, first and second arrays of lenses having non-equal radii may be merged to provide an array of non-polygonal lenses, for example having a "chain-wheel" like geometry. The first and second arrays of lenses may also be rotated with respect to each other.

The invention claimed is:

1. A view forming module for arrangement over and in registration with an image forming means of an autostereoscopic display device, the image forming means having an orthogonal array of display pixels spatially defined by an opaque matrix, the view forming module providing at least two optical functions, a view forming function and a brightness non-uniformity reducing function, wherein the view forming function modifies the direction of outputs of the display pixels such that the outputs of groups of the display pixels are projected in respective different directions as a plurality of views, the view forming function being provided by an array of parallel view forming elements arranged across the view forming module and having a first pitch, and wherein the brightness non-uniformity reducing function spreads or diverges the outputs of the display pixels such that brightness non-uniformities that would otherwise be caused by imaging of the opaque matrix are reduced, the brightness non-uniformity reducing function defining a second pitch across the view forming module of zero or less than the first pitch, and the brightness non-uniformity reducing function further defining an effective spreading angle in a plane perpendicular to axes of the view forming elements, the effective spreading angle being no greater than 1.5 times the angle that would exist between adjacent views projected by the view forming function in the absence of the brightness non-uniformity reducing function.

2. A view forming module according to claim 1, wherein the array of view forming elements is a first array of parallel lenticular lenses having the first pitch and each defining a curved focal surface.

3. A view forming module according to claim 1, wherein the brightness non-uniformity reducing function is provided by at least a second array of lenses arranged across the view forming module and having the second pitch.

4. A view forming module according to claim 3, wherein the second array of lenses is an array of parallel lenticular lenses provided at an optical interface different to the optical interface of the first array.

5. A view forming module according to claim 3, wherein first and second arrays of lenses are integrated into the same optical interface, such that the view forming and brightness non-uniformity reducing functions are provided by refraction at the same optical interface.

6. A view forming module according to claim 5, wherein the optical interface corresponding to each lens of the first array comprises a plurality of flat or non-flat faces defining a polygonal lens surface, the flat or non-flat faces each corresponding to a lens of the second array.

7. A view forming module according to claim 6, wherein the number of flat faces, $N_{micro\text{-}lens}$, comprised in each lens of the first array is equal to any one of the integers nearest to the value given by:

$$N_{views} \cdot \frac{1}{1 + \left| \frac{R_L \cdot N_{views}^2}{\Delta n \cdot p_L^2} \lambda \right|},$$

with $R_L$ the radius of curvature of the first lens array, $N_{views}$ the number of views provided by the view forming module, $\Delta n$ the difference of the refractive indices of the materials at either side of the optical interface, $p_L$ the first pitch of the first lens array, and $\lambda$ the typical wavelength of the light used.

8. A view forming module according to claim 1, wherein the brightness non-uniformity reducing function is provided by a light diffuser arranged across the view forming module.

9. A view forming module according to claim 8, wherein the light diffuser is arranged for spreading the outputs of the display pixels substantially only in the plane perpendicular to the axes of the view forming elements.

10. A view forming module according to claim 8, wherein the light diffuser is arranged for spreading the outputs of the display pixels with different spreading angles in first and second perpendicular planes.

11. A view forming module according to claim 10, wherein the light diffuser is rotated with respect to the array of view forming elements, such that the first and second perpendicular planes define acute angles with the axes of the view forming elements.

12. A view forming module according to claim 8, wherein the light diffuser is a holographic light diffuser.

13. An autostereoscopic display device comprising:
an image forming means having an orthogonal array of display pixels for producing a display, the display pixels being spatially defined by an opaque matrix; and
a view forming module being arranged over and in registration with the image forming means, the view forming module providing at least two optical functions, a view forming function and a brightness non-uniformity reducing function,
wherein the view forming function modifies the direction of outputs of the display pixels such that the outputs of groups of the display pixels are projected in respective different directions as a plurality of views, the view forming function being provided by an array of parallel view forming elements arranged across the view forming module and having a first pitch,
and wherein the brightness non-uniformity reducing function spreads or diverges the outputs of the display pixels such that brightness non-uniformities that would otherwise be caused by imaging of the opaque matrix are reduced, the brightness non-uniformity reducing function defining a second pitch across the view forming module of zero or less than the first pitch, and the brightness non-uniformity reducing function further defining an effective spreading angle in a plane perpendicular to axes of the view forming elements, the effective spreading angle being no greater than 1.5 times the angle that would exist between adjacent views projected by the view forming function in the absence of the brightness non-uniformity reducing function.

14. An autostereoscopic display device according to claim 13, wherein the focal surfaces defined by the first array of lenses each cross the plane defined by the array of display pixels at positions corresponding to a focal point for non-normal light.

15. An autostereoscopic display device according to claim 13, wherein the second pitch is equal to the first pitch divided by the number of views provided by the device.

16. An autostereoscopic imaging method comprising:
forming an image using an orthogonal array of display pixels, the display pixels being spatially defined by an opaque matrix; and
forming the image into a plurality of views projected in respective different directions using an array of parallel view forming elements arranged across the array of display pixels, the view forming elements modifying the direction of outputs from the display pixels, the view forming elements having a first pitch,
wherein the outputs of the display pixels are additionally spread or diverged such that brightness non-uniformities that would otherwise be caused by imaging of the opaque matrix are reduced, the spreading function defining a second pitch less than the first pitch, and the spreading function further defining an effective spreading angle in a plane perpendicular to axes of the view forming elements, the effective spreading angle being no greater than 1.5 times the angle that would exist between adjacent views projected by the view forming elements in the absence of the additional spreading.

* * * * *